United States Patent
Griffin et al.

(10) Patent No.: US 12,229,637 B2
(45) Date of Patent: Feb. 18, 2025

(54) DATA EXCHANGE BETWEEN A QUBIT IN A QUANTUM ISOLATION ZONE AND A STORAGE ENTITY OUTSIDE OF THE QUANTUM ISOLATION ZONE

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 362 days.

(21) Appl. No.: 17/552,594

(22) Filed: Dec. 16, 2021

(65) Prior Publication Data

US 2023/0196159 A1 Jun. 22, 2023

(51) Int. Cl.
*G06N 10/40* (2022.01)

(52) U.S. Cl.
CPC .................... *G06N 10/40* (2022.01)

(58) Field of Classification Search
CPC .............................. G06N 10/40; G06N 10/00
See application file for complete search history.

(56) References Cited

U.S. PATENT DOCUMENTS

| | | | |
|---|---|---|---|
| 7,853,011 B2 | 12/2010 | Kuang et al. | |
| 8,885,828 B2 | 11/2014 | Wiseman et al. | |
| 9,294,272 B2 | 3/2016 | Lutkenhaus et al. | |
| 9,870,273 B2 | 1/2018 | Dadashikelayeh et al. | |
| 10,733,522 B2 | 8/2020 | Curtis et al. | |
| 11,379,752 B1 * | 7/2022 | Griffin | G06N 10/80 |
| 11,556,835 B1 * | 1/2023 | Coady | G06N 10/80 |
| 2003/0014522 A1 * | 1/2003 | McBrearty | G06F 11/2097 714/E11.073 |
| 2012/0124432 A1 | 5/2012 | Pesetski et al. | |
| 2015/0154147 A1 | 6/2015 | Alboszta et al. | |
| 2017/0141286 A1 | 5/2017 | Kerman | |
| 2018/0062764 A1 | 3/2018 | Borrill | |
| 2019/0179530 A1 * | 6/2019 | Chen | G06F 3/0631 |

(Continued)

FOREIGN PATENT DOCUMENTS

| | | |
|---|---|---|
| CN | 101888276 A | 11/2010 |
| CN | 107317676 B | 5/2020 |

(Continued)

OTHER PUBLICATIONS

Arrazola, J.M et al., "Quantum circuits with many photons on a programmable nanophotonic chip," arXiv:2103.02109v1 [quant-ph], Mar. 3, 2021, 21 pages.

(Continued)

*Primary Examiner* — Stacy Whitmore
(74) *Attorney, Agent, or Firm* — Dority & Manning, P.A.

(57) ABSTRACT

A quantum isolation zone (QIZ) controller executing on a quantum computing device determines that a transfer of information is to occur between a first qubit allocated to a first QIZ of a plurality of QIZs implemented on the quantum computing device, and a storage entity outside of the first QIZ, the first QIZ inhibiting access to the first qubit by the storage entity. A second qubit that is available to be allocated to a service agent executing in the first QIZ is identified. Qubit metadata is modified to allocate the second qubit to the service agent. The service agent is instructed that the second qubit is available to facilitate the transfer of information between the first qubit and the storage entity outside of the first QIZ.

20 Claims, 21 Drawing Sheets

(56) References Cited

U.S. PATENT DOCUMENTS

| | | | |
|---|---|---|---|
| 2019/0332731 A1 | 10/2019 | Chen et al. | |
| 2020/0167515 A1 | 5/2020 | Pednault et al. | |
| 2020/0167685 A1 | 6/2020 | Griffin et al. | |
| 2020/0184031 A1 | 6/2020 | Horii | |
| 2020/0201655 A1 | 6/2020 | Griffin et al. | |
| 2020/0394544 A1 | 12/2020 | Low et al. | |
| 2021/0097419 A1 | 4/2021 | Limberg et al. | |
| 2021/0152189 A1 | 5/2021 | Murali et al. | |
| 2021/0374583 A1* | 12/2021 | Griffin | G06F 9/5022 |
| 2022/0164253 A1 | 5/2022 | On et al. | |
| 2022/0383171 A1* | 12/2022 | Griffin | G06F 1/3203 |
| 2022/0383172 A1* | 12/2022 | Griffin | G06N 10/80 |
| 2022/0383176 A1* | 12/2022 | Griffin | G06F 9/5027 |
| 2023/0153148 A1* | 5/2023 | Griffin | G06F 9/4843 |
| | | | 718/102 |

FOREIGN PATENT DOCUMENTS

| | | |
|---|---|---|
| CN | 108960435 B | 6/2020 |
| KR | 102231130 B1 | 3/2021 |
| WO | 2020081805 A1 | 4/2020 |

OTHER PUBLICATIONS

Goyal, K., "Using Graph States for Quantum Computation and Communication," Thesis in Partial Fulfillment of the Requirements for the Degree of Doctor of Philosophy, California Institute of Technology, Pasadena, California, May 27, 2009, 95 pages.

Goyeneche, D. et al., "Genuinely multipartite entangled states and orthogonal arrays," arXiv:1404.3586v2 [quant-ph], Jul. 18, 2014, 24 pages.

Hahn, F. et al., "Quantum network routing and local complementation," Quantum Information, vol. 5, No. 76, Sep. 2019, Nature Partner Journals, 7 pages.

Honrubia, E. et al., "Graph Approach to Quantum Teleportation Dynamics," Quantum Reports, vol. 2, Jul. 2020, MDPI, pp. 352-377.

Mina, M. et al., "EntangleNet: Theoretical Reestablishment of Entanglement in Quantum Networks," Applied Sciences, vol. 8, Oct. 2018, No. 1935, MDPI, 17 pages.

Salazar, R. et al., "Optimal allocation of quantum resources," arXiv:2006.16134v2 [quant-ph], Jul. 5, 2020, 13 pages.

Saggio, V. et al., "Experimental quantum speed-up in reinforcement learning agents," arXiv:2103.06294v1 [quant-ph], Mar. 10, 2021, 10 pages.

Stahlke, D. et al., "Quantum zero-error source-channel coding and non-commutative graph theory," arXiv:1405.5254v2 [quant-ph], Oct. 18, 2015, 24 pages.

Notice of Allowance for U.S. Appl. No. 17/538,211, dated Jun. 20, 2024, 19 pages.

Non-Final Office Action for U.S. Appl. No. 17/530,121, dated May 2, 2024, 20 pages.

Notice of Allowance for U.S. Appl. No. 17/538,211, dated Oct. 9, 2024, 9 pages.

Final Office Action for U.S. Appl. No. 17/530,121, dated Nov. 1, 2024, 15 pages.

\* cited by examiner

DATA EXCHANGE BETWEEN A QUBIT IN A QUANTUM ISOLATION ZONE AND A STORAGE ENTITY OUTSIDE OF THE QUANTUM ISOLATION ZONE

BACKGROUND

Quantum computing utilizes qubits to perform quantum calculations. Qubits are finite resources. As quantum computing continues to increase in popularity and become more commonplace, an ability to programmatically coordinate access to qubits will be desirable.

SUMMARY

Examples disclosed herein implement data exchange between a qubit in a quantum isolation zone (QIZ) and a storage entity outside of the QIZ. In particular, the examples facilitate the communication of data between a qubit allocated to a QIZ and thus not visible to any quantum process outside of the QIZ, and a storage entity outside of the QIZ.

In one example a method is provided. The method includes determining, by a QIZ controller executing on a quantum computing device, that a transfer of information is to occur between a first qubit allocated to a first QIZ of a plurality of QIZs implemented on the quantum computing device, and a storage entity outside of the first QIZ, the first QIZ inhibiting access to the first qubit by the storage entity. The method further includes identifying, by the QIZ controller, a second qubit that is available to be allocated to a service agent executing in the first QIZ. The method further includes modifying qubit metadata to allocate, by the QIZ controller, the second qubit to the service agent. The method further includes instructing the service agent that the second qubit is available to facilitate the transfer of information between the first qubit and the storage entity outside of the first QIZ.

In another example a quantum computing system is provided. The quantum computing system includes a memory and a processor device coupled to the memory. The processor device is to determine that a transfer of information is to occur between a first qubit allocated to a first QIZ of a plurality of QIZs implemented on a quantum computing device, and a storage entity outside of the first QIZ, the first QIZ inhibiting access to the first qubit by the storage entity. The processor device is further to identify a second qubit that is available to be allocated to a service agent executing in the first QIZ. The processor device is further to modify qubit metadata to allocate the second qubit to the service agent. The processor device is further to instruct the service agent that the second qubit is available to facilitate the transfer of information between the first qubit and the storage entity outside of the first QIZ.

In another example a non-transitory computer-readable storage medium is provided. The non-transitory computer-readable storage medium includes executable instructions to cause a processor device on a quantum computing system to determine that a transfer of information is to occur between a first qubit allocated to a first QIZ of a plurality of QIZs implemented on a quantum computing device, and a storage entity outside of the first QIZ, the first QIZ inhibiting access to the first qubit by the storage entity. The instructions are further to cause the processor device to identify a second qubit that is available to be allocated to a service agent executing in the first QIZ. The instructions are further to cause the processor device to modify qubit metadata to allocate the second qubit to the service agent. The instructions are further to cause the processor device to instruct the service agent that the second qubit is available to facilitate the transfer of information between the first qubit and the storage entity outside of the first QIZ.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
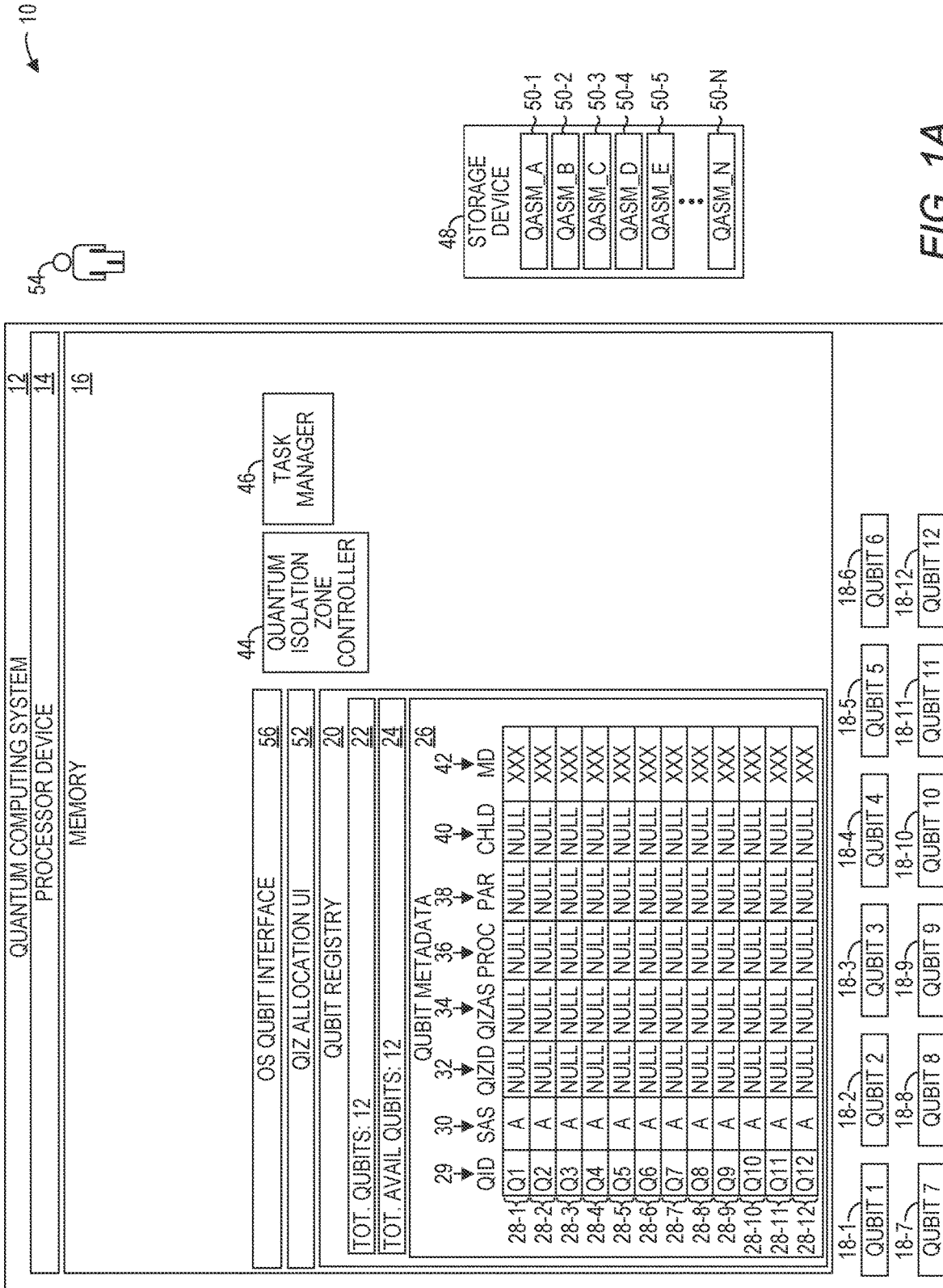
FIGS. 1A-1F are block diagrams of an environment, at successive points in time, in which quantum isolation zones can be practiced according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing utilizes qubits to perform quantum calculations. Qubits are finite resources, but as the technology evolves, quantum computing systems are implementing larger and larger numbers of qubits. As quantum computing continues to increase in popularity and become more commonplace, it is increasingly important for the operating system to control access to qubits to, for example, ensure that one quantum process does not inadvertently access a qubit utilized by another quantum process, ensure that qubits containing private information can only be accessed by quantum processes that should have access to such private information, and to generally isolate one quantum process from another quantum process.

The examples disclosed herein implement quantum isolation zones (QIZs) that ensure a quantum process can only access qubits allocated to the QIZ in which the quantum process executes, and has no visibility to or ability to access qubits allocated to other QIZs or that are otherwise implemented on the quantum computing system. The examples also implement quantum process relationship graphs that facilitate visibility of qubits by a plurality of quantum processes that execute within a QIZ and that have relationships with one another. A first quantum process executing in a QIZ that is not related to a second quantum process executing in the same QIZ has no visibility to the qubits allocated to the second quantum process. Thus, the examples facilitate isolation even within the same QIZ, or qubit sharing within the same QIZ among related quantum processes.

Additional examples disclosed herein implement data exchange between a qubit in a QIZ and a storage entity outside of the QIZ. In particular, the examples facilitate the communication of data between a qubit allocated to a QIZ and thus not visible to any quantum process outside of the QIZ, and a storage entity outside of the QIZ. The examples disclosed herein facilitate both the importing of data from a storage entity to a qubit allocated to a QIZ and the exporting of data from a qubit allocated to a QIZ to a storage entity.

In one example, a QIZ controller determines that a transfer of information is to occur between a first qubit allocated to a quantum process executing in a QIZ and a storage entity. The QIZ controller identifies a second qubit that is available to be allocated to a service agent executing in the QIZ. The QIZ controller modifies qubit metadata to allocate the second qubit to the service agent and instructs the service agent that the second qubit is available to facilitate the transfer of information between the first qubit and the storage entity. Based on whether the transfer of information is an import of data from the storage entity into the QIZ or an export of data from the QIZ to the storage entity, the service agent facilitates the transfer of information between the first qubit and the storage entity.

FIGS. 1A-1F are block diagrams of an environment, at successive points in time, in which QIZs can be practiced according to one implementation. Referring first to FIG. 1A, the environment 10 includes a quantum computing system 12 that operates in a quantum environment but can operate using classical computing principles or quantum computing principles. When using quantum computing principles, the quantum computing system 12 performs computations that utilize quantum-mechanical phenomena, such as superposition and entanglement. The quantum computing system 12 may operate under certain environmental conditions, such as at or near 0° Kelvin. When using classical computing principles, the quantum computing system 12 utilizes binary digits that have a value of either 1 or 0.

The quantum computing system 12 includes at least one processor device 14 and at least one memory 16. The quantum computing system 12 implements twelve qubits 18-1-18-12 (generally, qubits 18). The quantum computing system 12 includes a qubit registry 20 that maintains information about the qubits 18-1-18-12, including, by way of non-limiting example, a total qubits counter 22 that identifies the total number of qubits 18 implemented by the quantum computing system 12 and a total available qubits counter 24 that maintains count of the total number of qubits 18 that are currently available for allocation.

The qubit registry 20 also maintains qubit metadata 26, which comprises a plurality of metadata records 28-1-28-12 (generally, metadata records 28), each of which maintains information about a corresponding qubit 18-1-18-12. Each metadata record 28 includes a qubit identifier (QID) 29 that contains an identifier of the qubit 18-1-18-12 to which the respective metadata record 28 corresponds, a system availability status (SAS) 30 that identifies whether the corresponding qubit 18 is available for allocation at the quantum computing system level, a QIZ identifier (QIZID) 32 that identifies the QIZ, if any, to which the corresponding qubit 18 has been allocated, and a QIZ availability status (QIZAS) 34 that identifies whether the corresponding qubit 18, if allocated to a QIZ, is available in the QIZ or has been allocated to a quantum process executing in the QIZ. Each metadata record 28 also includes a process identifier 36 of the quantum process, if any, to which the corresponding qubit 18 has been allocated, a parent identifier 38 that identifies a parent quantum process, if any, of the quantum process to which the corresponding qubit 18 has been assigned, and a child identifier 40 that identifies a child quantum process, if any, of the quantum process to which the corresponding qubit 18 has been assigned. Each metadata record 28 may also include additional metadata 42 not relevant to the examples disclosed herein, such as metadata indicating a real-time state of the corresponding qubit 18, such as whether the qubit 18 is in an entangled state, is in superposition, or the like. While solely for purposes of illustration the quantum computing system 12 is described as having only twelve qubits 18, it is apparent that the quantum computing system 12 may have hundreds or thousands of qubits 18 in some implementations.

At the point in time illustrated in FIG. 1A, the qubits 18 are unallocated, and thus, the system availability status 30 for each metadata record 28 has a value of "A" indicating that the corresponding qubit 18 is available. The values of the other fields in the metadata records 28 are "NULL", which can comprise any value that indicates that the field is empty.

The quantum computing system 12 includes a QIZ controller 44 that, as described in greater detail below, operates to establish QIZs in which quantum processes execute and have access to allocated qubits 18, but no access or only controlled access to qubits 18 allocated to other QIZs. The QIZ controller 44 may be a component of the operating system and thus execute in a privileged mode (e.g., kernel mode). The quantum computing system 12 includes a task manager 46 that is configured to initiate a quantum process from a quantum program file, such as a quantum assembly language (QASM) file, or the like. In this example, a storage device 48 contains a plurality of QASM files 50-1-50-N, each of which includes quantum programming instructions that, when executed, implement a desired functionality.

The quantum computing system 12 may include a QIZ allocation user interface (UI) 52 that allows an operator 54 to interact with the QIZ controller 44 to establish a QIZ. The quantum computing system 12 may also include an operating system (OS) qubit interface 56 that is invoked when a quantum process attempts to read, write, or otherwise query a qubit 18. The OS qubit interface 56, in turn, communicates with the QIZ controller 44, or, in other implementations, the QIZ controller 44 may be integrated with the OS qubit interface 56.

Assume that the QIZ controller 44 receives a request from a requestor to allocate a first group of qubits 18 from available qubits 18 to establish a first QIZ that limits visibility of any quantum process associated with the first QIZ to only the qubits 18 in the first group of qubits 18. The request may identify the number of qubits 18 and, if applicable, other criteria, such as a particular type of qubit, or any other desired characteristics of the qubits 18.

In one example, the requestor may be the QIZ allocation UI 52 which makes the request in response to input from the operator 54. In another example, the request may be a programmatic request from a process executing on the quantum computing system 12 or elsewhere. In this example, the request indicated that six qubits 18 were to be allocated to the QIZ. The request may come directly to the QIZ controller 44, or indirectly via the OS qubit interface 56. The QIZ controller 44 accesses the qubit metadata 26 and identifies six qubits 18 that have a system availability status 30 that indicates the qubits 18 are available. In this example, the QIZ controller 44 determined that the six qubits 18-1-18-6 were available based on the system availability status 30 of the metadata records 28-1-28-6.

Figure 1B:
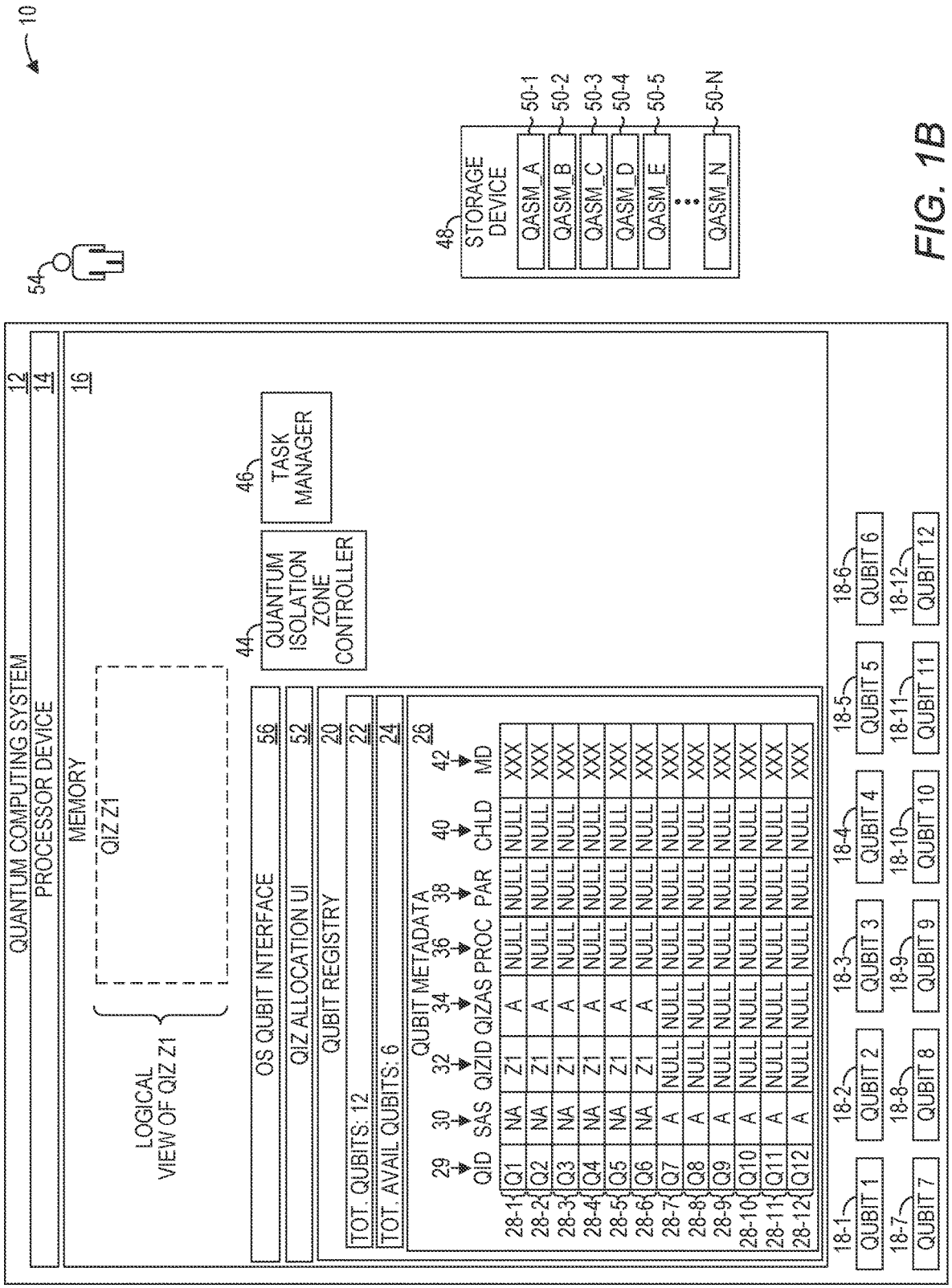

Referring now to FIG. 1B, the QIZ controller 44 modifies the system availability status 30 of the metadata records 28-1-28-6 with a value of "NA" (not available) to indicate that the six qubits 18-1-18-6 are no longer available for allocation. The QIZ controller 44 obtains a unique QIZ identifier, in this example, "Z1", and modifies the QIZ ID 32 to indicate that the qubits 18-1-18-6 have been allocated to the QIZ Z1. The QIZ controller 44 may generate the unique QIZ ID or be provided the unique QIZ ID by the requestor or some other mechanism. The QIZ controller 44 modifies the QIZ availability status 34 to indicate that the qubits 18-1-18-6 are available for allocation within the QIZ Z1. The QIZ controller 44 modifies the total available qubits counter 24 to indicate that six qubits 18 (i.e., qubits 18-7-18-12) are now available for allocation to a QIZ.

For purposes of illustration, a logical QIZ Z1 is illustrated in dashed lines in the Figures to facilitate an understanding of the isolation and relationship aspects of QIZs implemented by the examples herein. However, it should be understood that the QIZ Z1 illustrated in the Figures in dashed outline is a logical depiction only provided for ease of understanding and that the functionality of the QIZ Z1 is implemented via the QIZ controller 44, the qubit metadata 26, and other components as described herein.

Assume that the task manager 46 receives a request to initiate a quantum process based on the QASM file 50-1 into the QIZ Z1. The request may be contained in a schedule, may be received programmatically, or may be initiated via input from the operator 54. The task manager 46 may access the QASM file 50-1 and parse the QASM file 50-1 to determine that, during execution, a quantum process initiated from the QASM file 50-1 will utilize two qubits 18. In other implementations, the number of qubits 18 to be allocated to the quantum process may be contained in the request to initiate the quantum process. The task manager 46 sends a request to the QIZ controller 44 for an allocation of two qubits 18 from the QIZ Z1. The QIZ controller 44 receives the request to allocate two qubits 18 in the QIZ Z1 to a quantum process that is, or will be, associated with the QIZ Z1. Based on the metadata records 28, the QIZ controller 44 determines that the qubits 18-1 and 18-2 are available for allocation within the QIZ Z1.

Figure 1C:
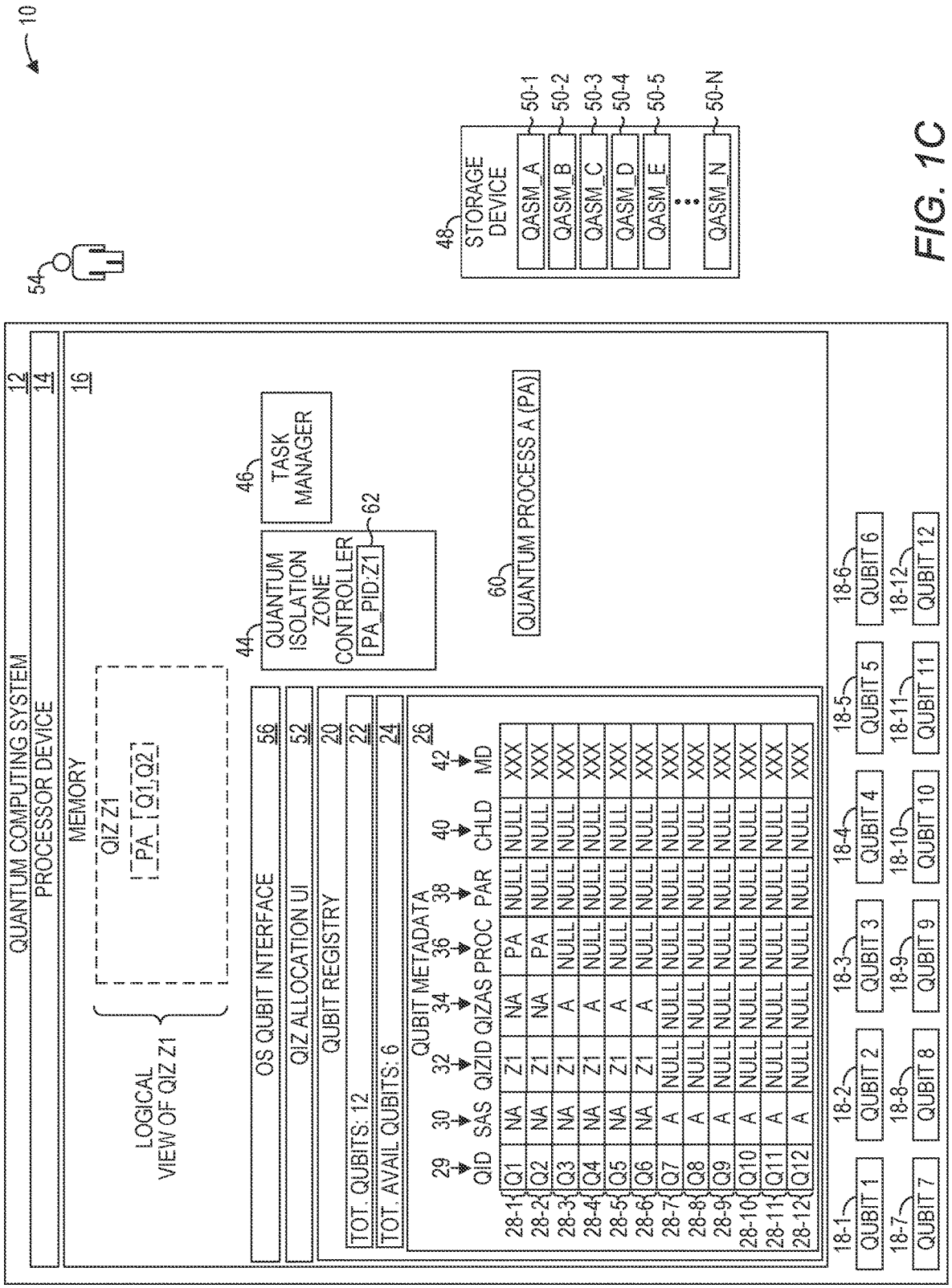

Referring now to FIG. 1C, the QIZ controller 44 modifies the QIZ availability status 34 of the metadata records 28-1 and 28-2 to indicate that the corresponding qubits 18-1 and 18-2 have been allocated and thus are no longer available for allocation (e.g., "NA"). The QIZ controller 44 provides the qubit IDs of the qubits 18-1 and 18-2 to the task manager 46. The task manager 46 initiates a quantum process 60 ("PA") into the QIZ Z1 with location/address information of the qubits 18-1 and 18-2. The task manager 46 provides a unique program ID (PID) of the quantum process 60 ("PA_PID") to the QIZ controller 44. The QIZ controller 44 maintains a mapping record 62 that maps the PID to the QIZ Z1. The quantum process 60 is now said to "execute in" or be "associated with" the QIZ Z1, because the visibility of and access to the qubits 18-1-18-12 is now constrained by the QIZ Z1.

As an example, assume that, at the point in time illustrated in FIG. 1C, the quantum process 60 issues a request to the OS qubit interface 56 to obtain a list of qubit IDs of all qubits 18 to which the quantum process 60 has access (i.e., read access and/or write access) or which are available for allocation. The OS qubit interface 56 communicates with the QIZ controller 44. The QIZ controller 44 determines the PID of the requestor, in this case the PID PA_PID, which is the PID of the quantum process 60. The QIZ controller 44 accesses the mapping record 62 and determines that the quantum process 60 is associated with the QIZ Z1. The QIZ controller 44 accesses the metadata records 28 and determines that the qubits 18-1-18-6 have been allocated to the QIZ Z1, and that the four qubits 18-3-18-6 are available. Because the qubits 18-1 and 18-2 have already been allocated to the quantum process 60, and the four qubits 18-3-18-6 are available, the QIZ controller 44 returns the qubit IDs of the qubits 18-1-18-6 to the quantum process 60 via the OS qubit interface 56, indicating that the quantum process 60 has access to the qubits 18-1 and 18-2 and that the qubits 18-3-18-6 are available for allocation. Thus, from the perspective of the quantum process 60, the quantum computing device 12 contains four available qubits 18, and the quantum process 60 is unaware of and unable to access (e.g., is isolated from) the actual additional available qubits 18-7-18-12.

Assume that, in response to the information that the qubits 18-3-18-6 are available, the quantum process 60 issues a request to the OS qubit interface 56 to have an additional qubit 18 allocated to the quantum process 60. The OS qubit interface 56 provides the request to the QIZ controller 44. The QIZ controller 44 then selects one of the qubits 18-3-18-6, modifies the appropriate metadata record 28 to indicate the qubit 18 is now allocated to the quantum process 60, and returns information to the quantum process 60 identifying the allocated qubit 18. Note that this is merely an example of a potential action that the quantum process 60 may take, and is thus not reflected in the metadata records 28 illustrated in FIG. 1C.

Figure 1D:
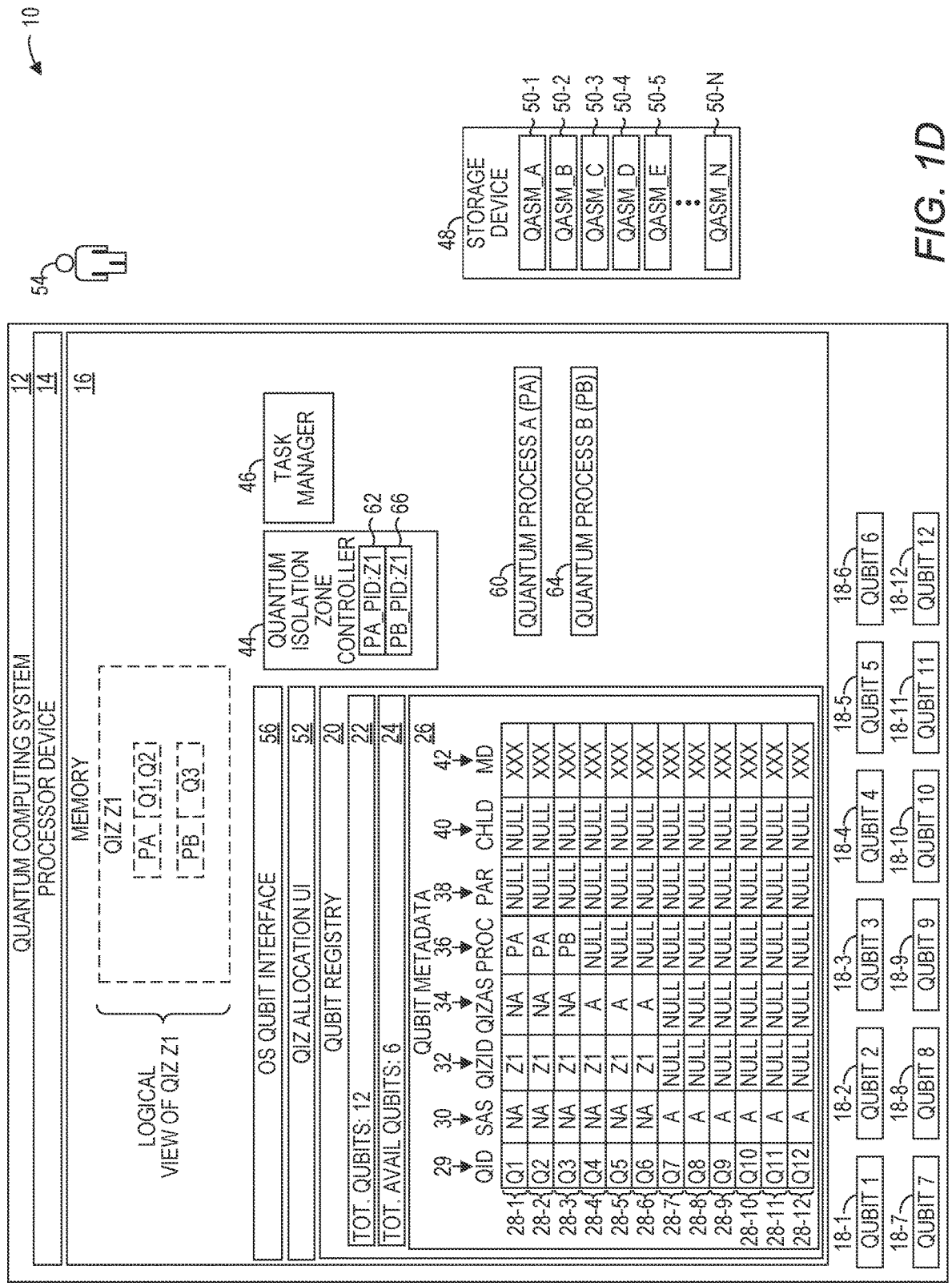

Assume that the task manager 46 receives a request to initiate a quantum process based on the QASM file 50-2 into the QIZ Z1. The task manager 46 may access the QASM file 50-2 and parse the QASM file 50-2 to determine that, during execution, the quantum process will utilize one qubit 18. The task manager 46 sends a request to the QIZ controller 44 for an allocation of one qubit 18 from the QIZ Z1. The QIZ controller 44 receives the request to allocate one qubit in the QIZ Z1 to a quantum process that is, or will be, associated with the QIZ Z1. Based on the metadata records 28, the QIZ controller 44 determines that the qubit 18-3 is available for allocation within the QIZ Z1. Referring now to FIG. 1D, the QIZ controller 44 modifies the QIZ availability status 34 of the metadata record 28-3 to indicate that the corresponding qubit 18-3 has been allocated and thus is no longer available for allocation (e.g., "NA").

The QIZ controller 44 provides the qubit ID of the qubit 18-3 to the task manager 46. The task manager 46 initiates a quantum process 64 ("PB") into the QIZ Z1 with location information of the qubit 18-3. The task manager 46 provides a unique PID of the quantum process 64 ("PB_PID") to the QIZ controller 44. The QIZ controller 44 maintains a mapping record 66 that maps the PID to the QIZ Z1. The quantum process 64 is now said to "execute in" or be "associated with" the QIZ Z1.

Assume that, at the point in time illustrated in FIG. 1D, subsequent to the allocation of the qubit 18-3 to the quantum process 64, the quantum process 60 issues a request to the OS qubit interface 56 to obtain a list of qubit IDs of all qubits 18 to which the quantum process 60 has access (i.e., read access and/or write access) and which are available for allocation. The OS qubit interface 56 communicates with the QIZ controller 44. The QIZ controller 44 determines the PID of the requestor, in this case the PID PA_PID, which is the PID of the quantum process 60. The QIZ controller 44 accesses the mapping record 62 and determines that the quantum process 60 is associated with the QIZ Z1. The QIZ controller 44 accesses the metadata records 28 and determines that the qubits 18-1-18-6 have been allocated to the QIZ Z1, the qubit 18-3 has been allocated to the quantum process 64, and that the three qubits 18-4-18-6 are available. Based on the metadata record 28-3, the QIZ controller 44 determines that the quantum process 64 is not related to the quantum process 60 because the parent identifier 38 and the child identifier 40 are NULL, indicating that the quantum process 60 has no parent process or child process at this time. Because the quantum process 60 and the quantum process 64 are unrelated, the quantum process 64 has no visibility to or access to qubits 18 allocated to the quantum process 60, and the quantum process 60 has no visibility to or access to qubits 18 allocated to the quantum process 64.

Because the qubit 18-3 has been allocated to the quantum process 64, and the three qubits 18-4-18-6 are available, the QIZ controller 44 returns the qubit IDs of the qubits 18-1, 18-2, 18-4-18-6 to the quantum process 60 via the OS qubit interface 56, indicating that the quantum process 60 has access to the qubits 18-1 and 18-2, and that the qubits 18-4-18-6 are available for allocation. The quantum process 60 is thus unaware of the qubit 18-3 or the qubits 18-7-18-12.

Figure 1E:
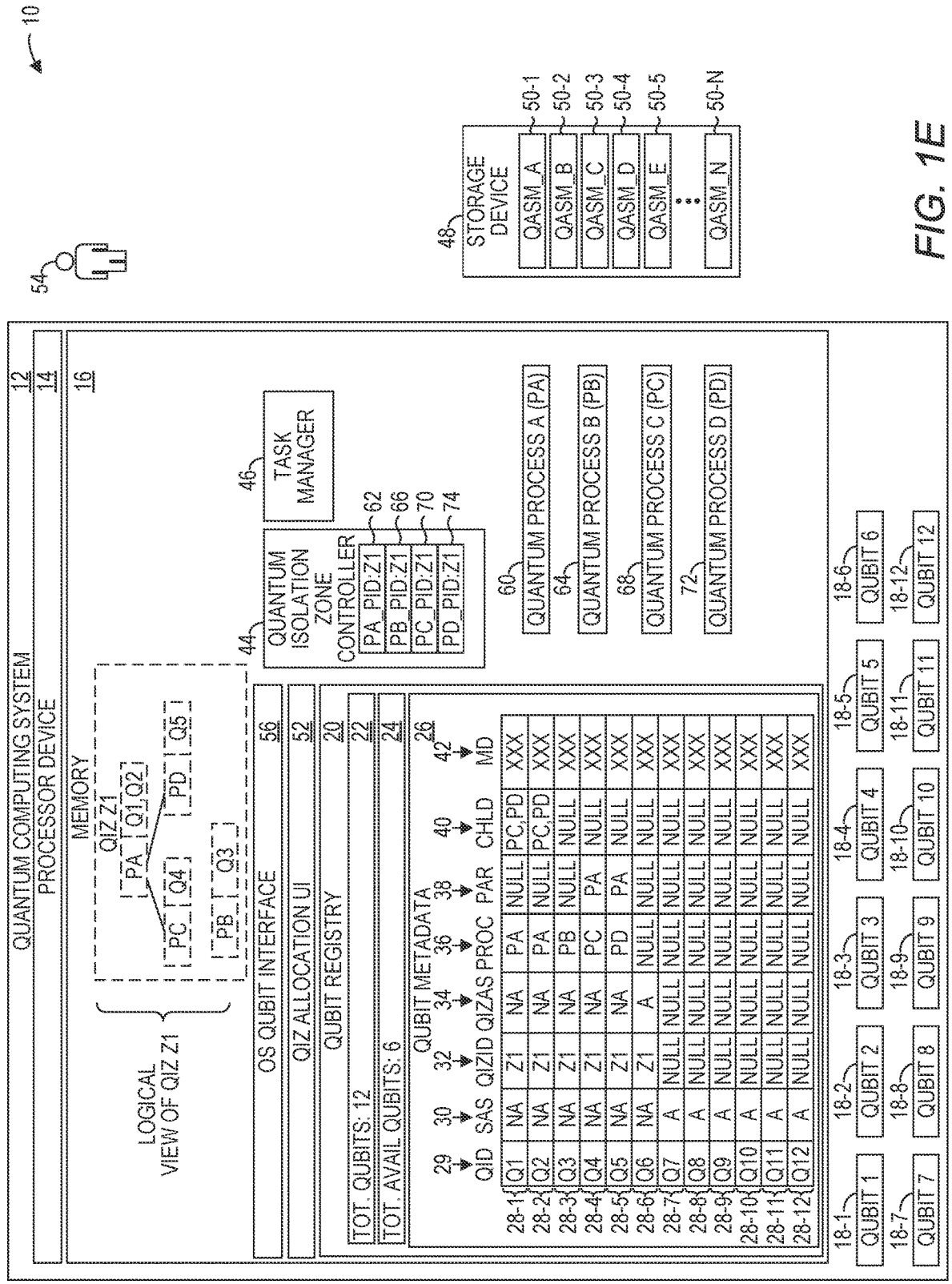

Referring now to FIG. 1E, a QIZ relationship graph that establishes relationships among quantum processes in a QIZ will be discussed. Assume that, in a manner similar to that discussed above with regard to the quantum processes 60 and 64, a quantum process 68 ("PC") is initiated from the QASM file 50-3 into the QIZ Z1 and allocated the qubit 18-4. The QIZ controller 44 generates a mapping record 70 that maps the PID of the quantum process 68 ("PC_PID") to the QIZ Z1. However, in this example, the quantum process 68 is identified as a child process of the quantum process 60. The designation may occur in any of several different manners. In one implementation, the task manager 46 may communicate to the QIZ controller 44 that the quantum process 68 is to be designated a child process of the quantum process 60. In another example, the request to initiate the quantum process 68 from the QASM file 50-3, and to allocate a qubit 18 to the quantum process 68, may originate from the quantum process 60. In this example, the act of the quantum process 60 requesting the initiation of the quantum process 68 by itself identifies the parent-child relationship.

The QIZ controller 44 modifies the QIZ availability status 34 of the metadata record 28-4 to indicate that the qubit 18-4 is no longer available for allocation. The QIZ controller 44 modifies the process identifier 36 of the metadata record 28-4 to indicate that the qubit 18-4 is allocated to the quantum process 68. The QIZ controller 44 modifies the parent identifier 38 of the metadata record 28-4 to indicate that the quantum process 60 is a parent process of the quantum process 68. The QIZ controller 44 modifies the child identifier 40 of the metadata records 28-1 and 28-2 to indicate that the quantum process 68 is a child process of the quantum process 60.

Assume further that a quantum process 72 ("PD") is initiated from the QASM file 50-4 into the QIZ Z1 and allocated the qubit 18-5. The QIZ controller 44 generates a mapping record 74 that maps the PID of the quantum process 72, PD_PID, to the QIZ Z1. In this example, the quantum process 72 is also identified as a child process of the quantum process 60.

The QIZ controller 44 modifies the QIZ availability status 34 of the metadata record 28-5 to indicate that the qubit 18-5 is no longer available for allocation. The QIZ controller 44 modifies the process identifier 36 of the metadata record 28-5 to indicate that the qubit 18-5 is allocated to the quantum process 72. The QIZ controller 44 modifies the parent identifier 38 of the metadata record 28-5 to indicate that the quantum process 60 is a parent process of the quantum process 72. The QIZ controller 44 modifies the child identifier 40 of the metadata records 28-1 and 28-2 to indicate that the quantum process 72 is a child process of the quantum process 60.

The metadata records 28-1, 28-2, 28-4 and 28-5 establish a relationship graph that appears, logically, as that illustrated in the logical view of the QIZ Z1 in FIG. 1E, such that the quantum process 60 is the parent process of the child quantum processes 68 and 72. As will be discussed herein, the relationship graph established in the metadata records 28-1, 28-2, 28-4, and 28-5 impacts the visibility of qubits 18 by the quantum processes 60, 68, and 72.

To illustrate the impact of the relationship graph in the QIZ Z1, assume that the quantum process 60 issues a request to the OS qubit interface 56 to obtain a list of qubit IDs of all qubits 18 to which the quantum process 60 has access (i.e., read access and/or write access) or which are available for allocation. The OS qubit interface 56 communicates with the QIZ controller 44. The QIZ controller 44 determines the PID of the requestor, in this case the PID PA_PID, which is the PID of the quantum process 60. The QIZ controller 44 accesses the mapping record 62 and determines that the quantum process 60 is associated with the QIZ Z1. The QIZ controller 44 accesses the metadata records 28 and determines that the qubits 18-1-18-6 have been allocated to the QIZ Z1, and that the qubit 18-6 is available. The QIZ controller 44 also determines that the qubits 18-1 and 18-2 have been allocated to the quantum process 60. The QIZ controller 44 determines that the quantum process 60 has two child processes executing in the QIZ Z1, the quantum processes 68 and 72. Because the quantum processes 68 and 72 are child processes of the quantum process 60, the quantum process 60 has access to the qubits 18-4 and 18-5 allocated to the quantum processes 68 and 72, respectively. The QIZ controller 44 returns the qubit IDs of the qubits 18-1, 18-2, and 18-4-18-6, indicating that the quantum process 60 has access to the qubits 18-1, 18-2, 18-4, and 18-5, and that the qubit 18-6 is available for allocation.

Assume next that the quantum process 68 issues a request to the OS qubit interface 56 to obtain a list of qubit IDs of all qubits 18 to which the quantum process 68 has access (i.e., read access and/or write access) or which are available for allocation. The OS qubit interface 56 communicates with the QIZ controller 44. The QIZ controller 44 determines the PID of the requestor, in this case the PID PC_PID, which is the PID of the quantum process 68. The QIZ controller 44 accesses the mapping record 70 and determines that the quantum process 68 is associated with the QIZ Z1. The QIZ controller 44 accesses the metadata records 28 and determines that the qubits 18-1-18-6 have been allocated to the QIZ Z1, and that the qubit 18-6 is available. The QIZ controller 44 also determines that the qubit 18-4 has been allocated to the quantum process 68. The QIZ controller 44 determines that the quantum process 68 has no child processes executing in the QIZ Z1, and that the quantum process 60 is a parent process of the quantum process 68. Because the quantum process 60 is a parent process of the quantum process 68, the quantum process 68 has access to the qubits 18-1 and 18-2 allocated to the quantum process 60. However, because the quantum process 72 is neither a parent process nor a child process of the quantum process 68, the quantum process 68 has no visibility to the qubit 18-5 allocated to the quantum process 72. The QIZ controller 44 returns the qubit IDs of the qubits 18-1, 18-2, 18-4 and 18-6, indicating that the quantum process 68 has access to the qubits 18-1, 18-2, and 18-4, and that the qubit 18-6 is available for allocation.

Figure 1F:
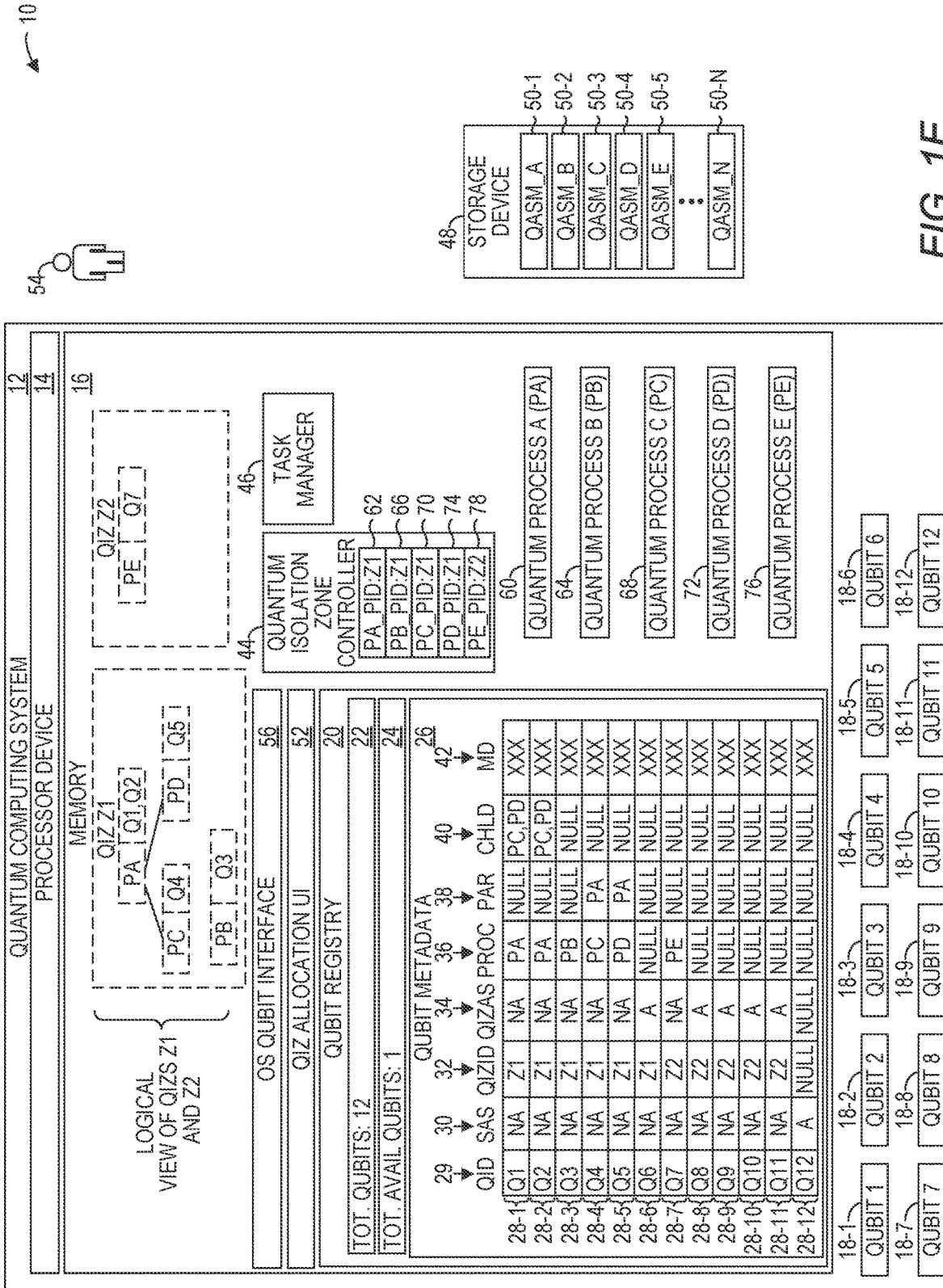

The QIZ controller 44 receives a request, from a requestor, to allocate a second group of qubits 18 from available qubits 18 to establish a second QIZ that limits visibility of any quantum process associated with the second QIZ to only the qubits 18 in the second group of qubits 18. In this example, the request indicates that five qubits 18 are to be allocated to the second QIZ. The QIZ controller 44 accesses the qubit metadata 26 and identifies five qubits 18 that have a system availability status 30 that indicates the qubits 18 are available. In this example, the QIZ controller 44 determines that the five qubits 18-7-18-11 are available based on the system availability status 30 of the metadata records 28-7-28-11. Referring now to FIG. 1F, the QIZ controller 44 modifies the system availability status 30 of the metadata records 28-7-28-11 to indicate that the five qubits 18-7-18-11 are no longer available for allocation. The QIZ controller 44 obtains a unique QIZ identifier, in this example, "Z2", and modifies the QIZ ID 32 of the metadata records 28-7-28-11 to indicate that the qubits 18-7-18-11 have been allocated to the QIZ Z2. The QIZ controller 44 modifies the QIZ availability status 34 of the metadata records 28-7-28-11 to indicate that the qubits 18-7-18-11 are available for allocation within the QIZ Z2. The QIZ controller 44 modifies the total available qubits counter 24 to indicate that one qubit 18 (i.e., qubit 18-12) is now available for allocation to a QIZ.

Assume further that the task manager 46 receives a request to initiate a quantum process based on the QASM file 50-5 into the QIZ Z2. The task manager 46 may access the QASM file 50-5 and parse the QASM file 50-5 to determine that, during execution, the quantum process initiated from the QASM file 50-5 will utilize one qubit 18. The task manager 46 sends a request to the QIZ controller 44 for an allocation of one qubit 18 from the QIZ Z2. The QIZ controller 44 receives the request to allocate one qubit in the QIZ Z2 to a quantum process that is, or will be, associated with the QIZ Z2. Based on the metadata records 28, the QIZ controller 44 determines that the qubit 18-7 is available for allocation within the QIZ Z2 and modifies the QIZ availability status 34 of the metadata record 28-7 to indicate that the corresponding qubit 18-7 has been allocated and thus is no longer available for allocation (e.g., "NA").

The QIZ controller 44 provides the qubit ID of the qubit 18-7 to the task manager 46. The task manager 46 initiates a quantum process 76 ("PE") into the QIZ Z2 with location information of the qubit 18-7. The task manager 46 provides a unique program ID (PID) ("PE_PID") of the quantum process 76 to the QIZ controller 44. The QIZ controller 44 generates a mapping record 78 that maps the PID to the QIZ Z2. The quantum process 60 is now said to "execute in" or be "associated with" the QIZ Z2.

Assume that, at the point in time illustrated in FIG. 1F, the quantum process 76 issues a request to the OS qubit interface 56 to obtain a list of qubit IDs of all qubits 18 to which the quantum process 76 has access (i.e., read access and/or write access) or which are available for allocation. The OS qubit interface 56 communicates with the QIZ controller 44. The QIZ controller 44 determines the PID of the requestor, in this case the PID PE_PID, which is the PID of the quantum process 76. The QIZ controller 44 accesses the mapping record 78 and determines that the quantum process 76 is associated with the QIZ Z2. The QIZ controller 44 accesses the metadata records 28 and determines that the qubits 18-7-18-11 have been allocated to the QIZ Z2, and that the qubits 18-8-18-11 are available. Because the qubit 18-7 has already been allocated to the quantum process 76 and the four qubits 18-8-18-11 are available, the QIZ controller 44 returns the qubit IDs of the qubits 18-7-18-11 to the quantum process 76 via the OS qubit interface 56, indicating that the quantum process 76 has access to the qubit 18-7, and that the qubits 18-8-18-11 are available for allocation. Thus, from the perspective of the quantum process 76, the quantum computing device 12 contains four available qubits 18, and the quantum process 76 is unaware of and unable to access (e.g., is isolated from) the qubits 18-1-18-6 and 18-12.

It is noted that, because the QIZ controller 44 is a component of the quantum computing system 12, functionality implemented by the QIZ controller 44 may be attributed to the quantum computing system 12 generally. Moreover, in examples where the QIZ controller 44 comprises software instructions that program the processor device 14 to carry out functionality discussed herein, functionality implemented by the QIZ controller 44 may be attributed herein to the processor device 14.

Figure 2:
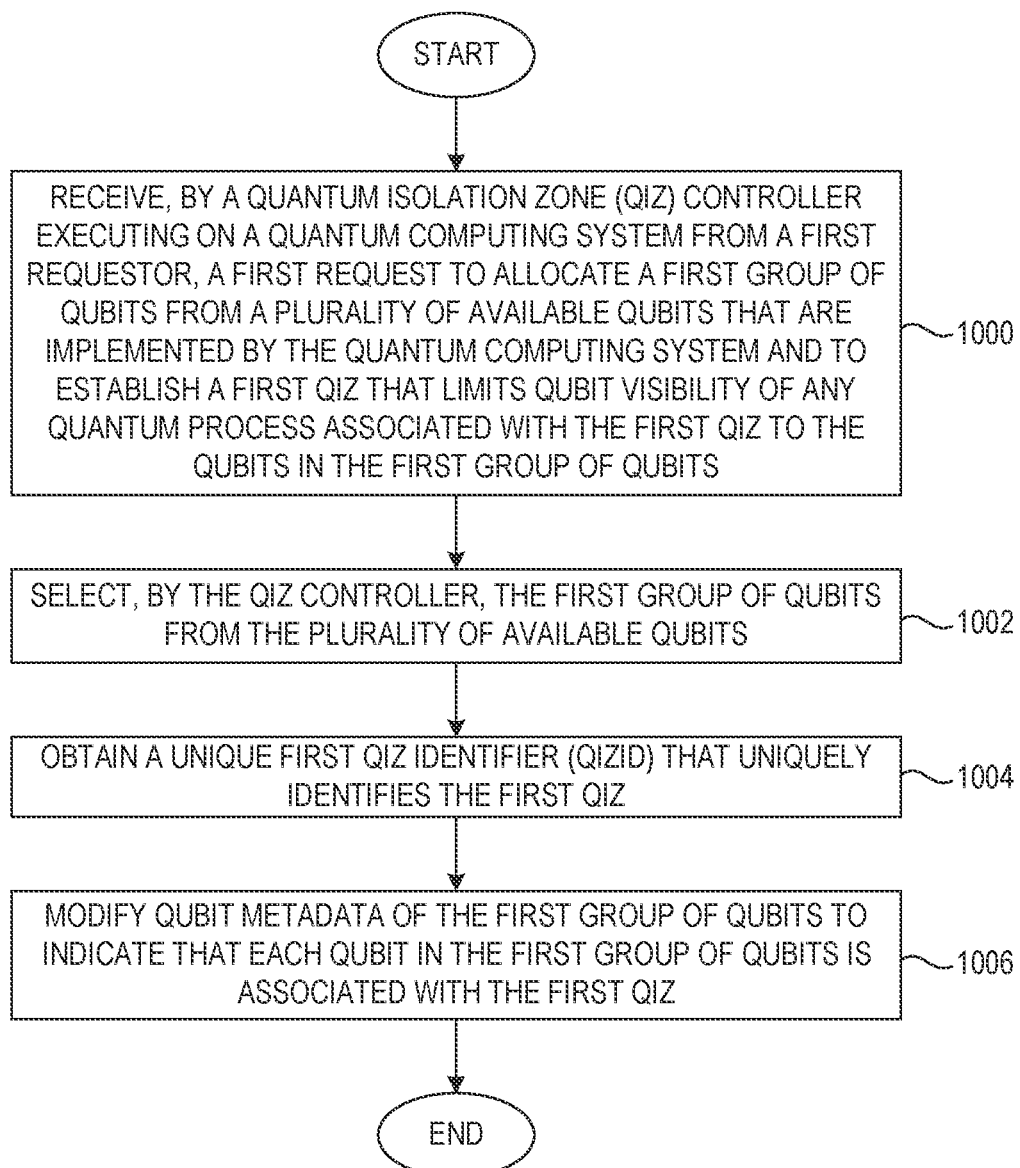
FIG. 2 is a flowchart of a method for implementing quantum isolation zones according to one implementation.

FIG. 2 is a flowchart of a method for implementing QIZs according to one implementation. FIG. 2 will be discussed in conjunction with FIGS. 1A-1F. The QIZ controller 44 receives, from a requestor, a request to allocate a group of the qubits 18 from the plurality of available qubits 18 that are implemented by the quantum computing system 12 and establish the QIZ Z1 that limits qubit visibility of any quantum process associated with the QIZ Z1 to only the qubits 18 in the group of qubits 18 (FIG. 2, block 1000). The QIZ controller 44 selects the first group of qubits 18-1-18-6 from the plurality of available qubits 18-1-18-12 (FIG. 2, block 1002). The QIZ controller 44 obtains the QIZ identifier (QIZID) Z1 that uniquely identifies the QIZ Z1 (FIG. 2, block 1004). The QIZ controller 44 modifies the metadata records 28-1-28-6 of the group of qubits 18-1-18-6 to indicate that each qubit 18 in the group of qubits 18-1-18-6 is associated with the QIZ Z1 (FIG. 2, block 1006).

Figure 3A:
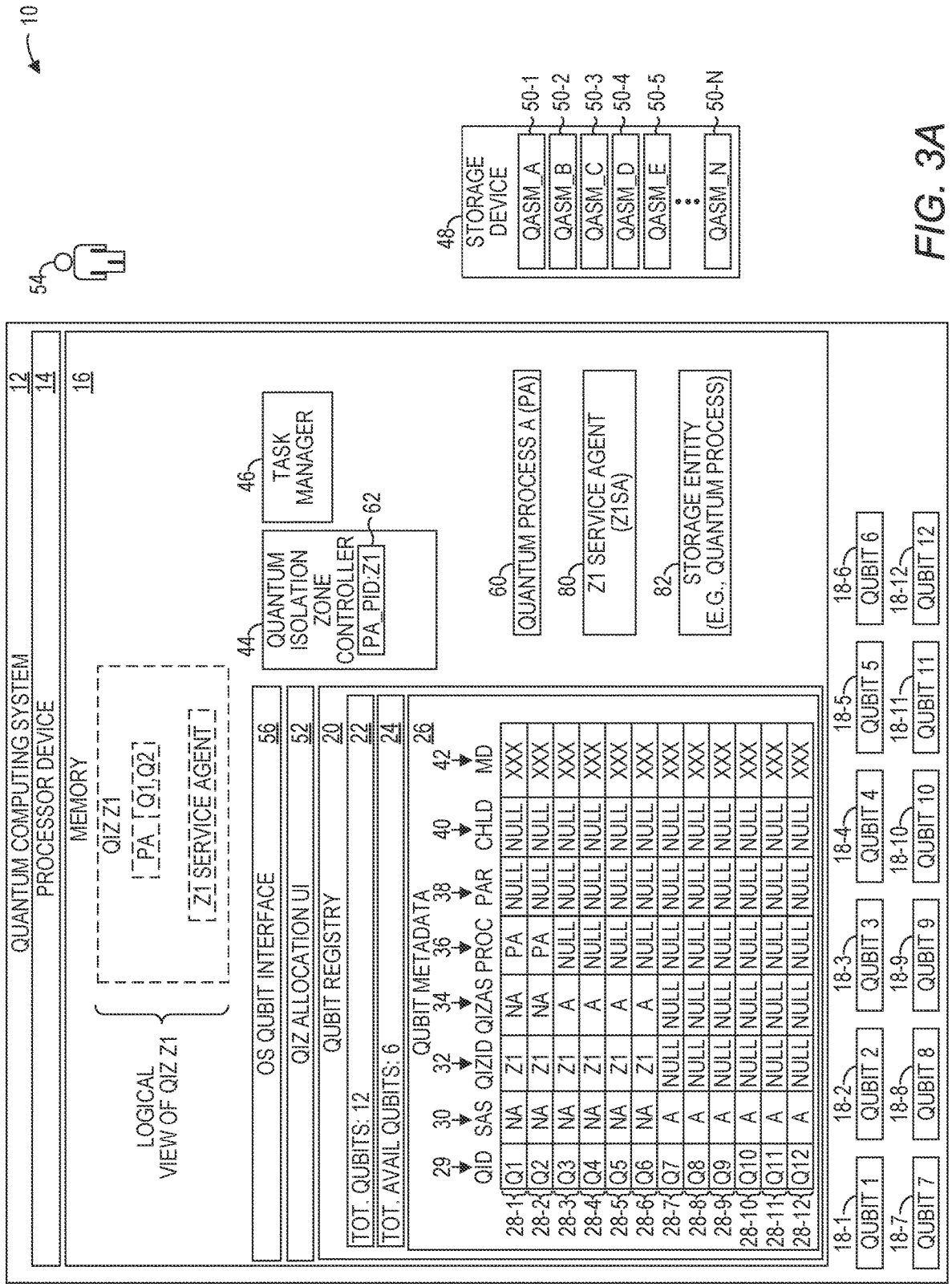
FIGS. 3A-3C are block diagrams illustrating an importation of data into a quantum isolation zone (QIZ) according to one implementation.
Figure 3B:
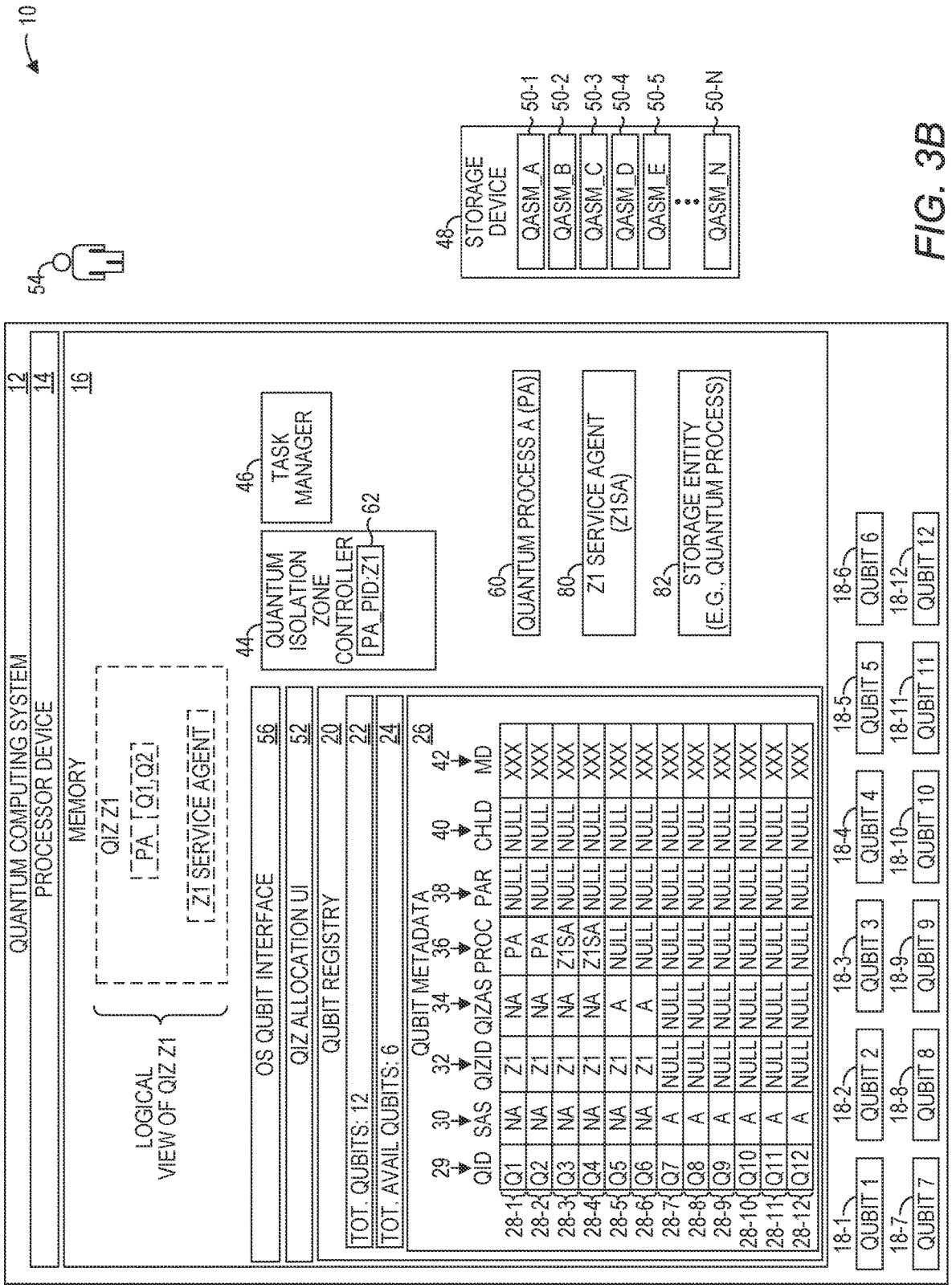
Figure 3C:
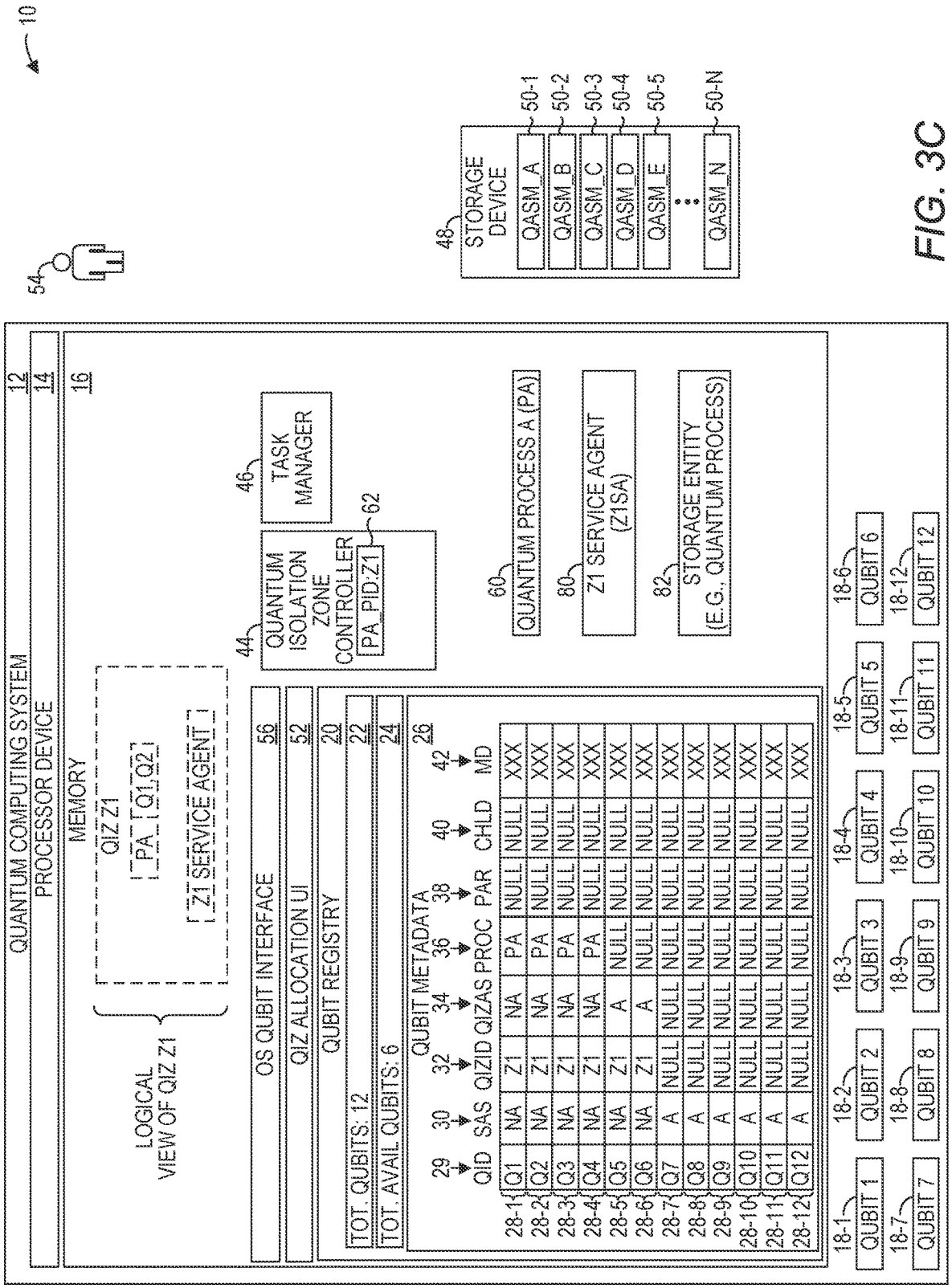

FIGS. 3A-3C are block diagrams of the environment 10 according to another implementation. Referring first to FIG. 3A, in this implementation, as part of the establishment of the QIZ Z1 or in response to a request to transfer information, the QIZ controller 44 or another OS component initiates a service agent 80 that is associated with the QIZ Z1 and operates to facilitate the transfer of information between the QIZ Z1 and a storage entity outside of the QIZ Z1. The service agent 80 may be a component of the operating system and thus execute in a privileged mode (e.g., kernel mode). Each QIZ implemented on the quantum computing system 12 may have a separate service agent associated with the respective QIZ.

In this example, the transfer of information is an importation of information into the QIZ Z1 from a storage entity 82. The storage entity 82 can comprise, for example, an executing process, a storage location such as a memory or a storage device, an address, such as an IP address where information can be streamed to or from, or any other entity via which information may be obtained or may be sent. In this example, the storage entity 82 comprises a process that desires to import data to the QIZ Z1, and in particular to the quantum process 60.

In this example, the storage entity 82 sends a request to the QIZ controller 44 to transfer information to the QIZ Z1, and in particular to the quantum process 60. The request may identify, for example, that two qubits 18 of information are to be transferred to the quantum process 60. The QIZ controller 44 accesses the qubit metadata 26 and identifies the two qubits 18-3-18-4 as being allocated to the QIZ Z1, and as being available for allocation within the QIZ Z1. If the QIZ Z1 has no available qubits 18, then the QIZ controller 44 may determine whether other qubits 18 implemented by the quantum computing system 12 may be available to be allocated to the QIZ Z1, and if so, may then modify the qubit metadata 26 to allocate such qubits 18 to the QIZ Z1.

Referring now to FIG. 3B, the QIZ controller 44 modifies the qubit metadata 26 to allocate the qubits 18-3-18-4 to the service agent 80. The QIZ controller 44 sends a message to the service agent 80 indicating that there is an import request and that the two qubits 18-3 and 18-4 have been allocated to the service agent 80 to utilize in the transfer of information. The QIZ controller 44 sends a message to the storage entity 82 that provides the address, such as an IP address and port number, of the service agent 80.

The storage entity 82 may then provide the information to the service agent 80, which in turns stores the information in the qubits 18-3 and 18-4. When the storage entity 82 has completed the transfer of information, in one implementation, the service agent 80 may then inform the QIZ controller 44 that the information has been imported into the QIZ Z1. Referring now to FIG. 3C, the QIZ controller 44 may then modify the qubit metadata 26 to allocate the qubits 18-3 and 18-4 to the quantum process 60. The QIZ controller 44 may then send the quantum process 60 a message indicating that data has been imported to the QIZ Z1 for the quantum process 60. The message may provide the address/location information of the qubits 18-3 and 18-4. The quantum process 60 may then access the data in the qubits 18-4 and 18-4 using the address/location information provided by the QIZ controller 44.

Figure 4A:
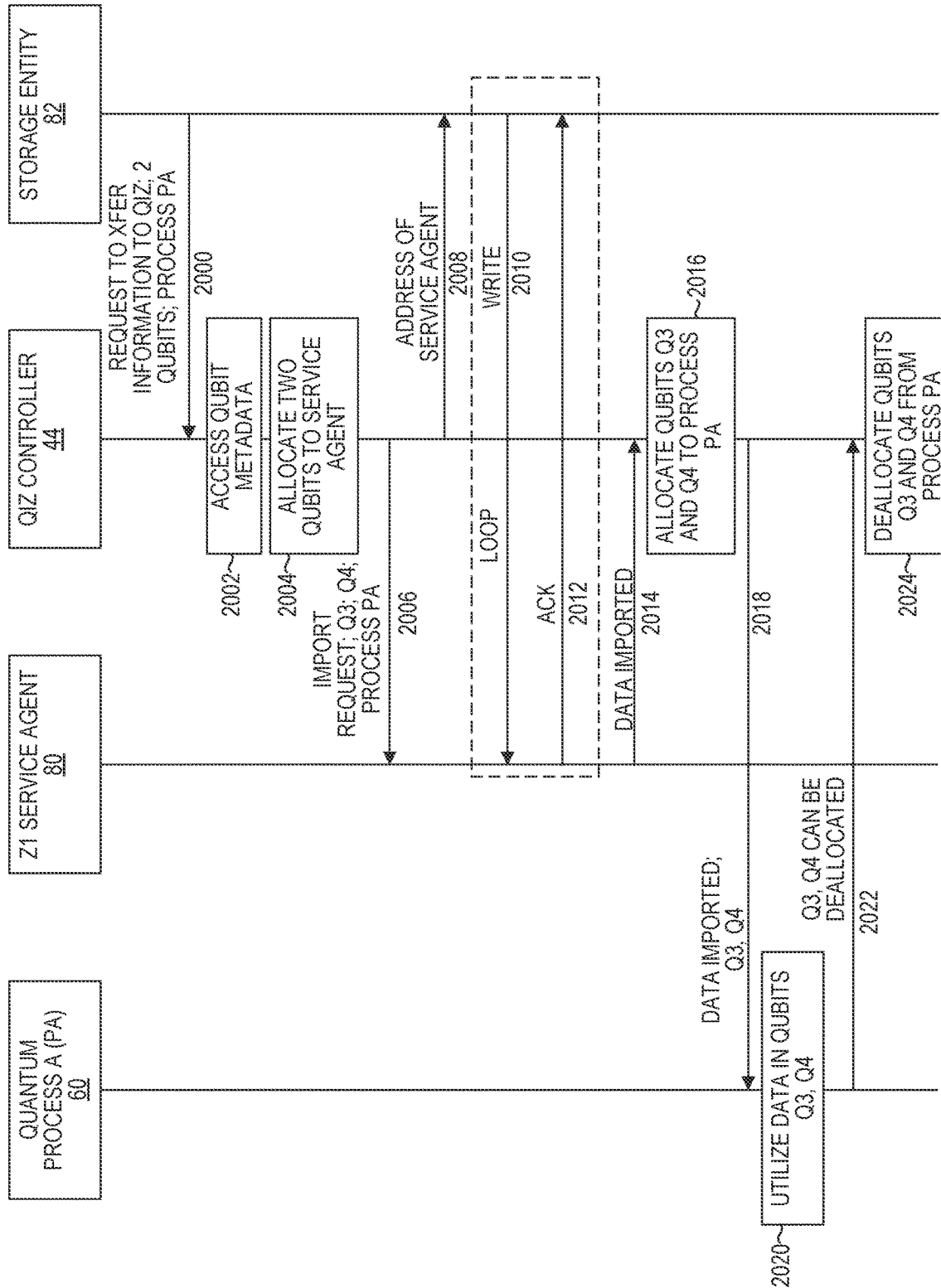
FIGS. 4A-4B are message sequence diagrams illustrating communications between and actions taken by components illustrated in FIGS. 3A-3C according to one implementation.

FIG. 4A is a message sequence diagram illustrating components illustrated in FIGS. 3A-3C, messages communicated between such components, and actions taken by such components to import information into the QIZ Z1 according to one implementation. The storage entity 82 sends a request to the QIZ controller 44 to transfer information to the QIZ Z1. In this example, the request identifies the quantum process PA and indicates that two qubits will be needed to transfer the information (FIG. 4A, step 2000). The QIZ controller 44 accesses the qubit metadata 26 and identifies the qubits 18-3 and 18-4 as being allocated to the QIZ Z1 and as being available for allocation within the QIZ Z1 (FIG. 4A, step 2002). The QIZ controller 44 modifies the qubit metadata 26 to allocate the qubits 18-3 and 18-4 to the service agent 80. In particular, the QIZ controller 44 modifies the process identifier 36 of the metadata records 28-3 and 28-4 to identify the qubits 18-3 and 18-4 as being allocated to the service agent 80 and modifies the QIZ availability status 34 of the metadata records 28-3 and 28-4 to indicate that the qubits 18-3 and 18-4 are no longer available for allocation (FIG. 4A, step 2004).

The QIZ controller 44 sends a message to the service agent 80 indicating that a request to import information into the QIZ Z1 has been made, and that the qubits 18-3 and 18-4 have been allocated to the service agent 80 to facilitate the transfer of information into the QIZ Z1. The message also indicates that the information is for the quantum process 60 (FIG. 4A, step 2006).

The QIZ controller 44 sends a message to the storage entity 82 identifying the address/location of the service agent 80 (FIG. 4A, step 2008). The storage entity 82 and the service agent 80 engage in a transfer of information from the storage entity 82 to the service agent 80. The service agent 80 stores the imported information in the qubits 18-3 and 18-4 (FIG. 4A, steps 2010-2012).

When the transfer is complete, the service agent 80 sends a message to the QIZ controller 44 indicating that the transfer is complete (FIG. 4A, step 2014). In this example, the QIZ controller 44 then modifies the qubit metadata 26 to allocate the qubits 18-3-18-4 to the quantum process 60 (FIG. 4A, step 2016). The QIZ controller 44 may then send a message to the quantum process 60 indicating that data has been imported, and that the data is stored in the qubits 18-3 and 18-4 that have now been allocated to the quantum process 60 (FIG. 4A, step 2018).

The quantum process 60 utilizes the data in the qubits 18-3-18-4 (FIG. 4A, step 2020). At a subsequent point in time the quantum process 60 may determine that the qubits 18-3 and 18-4 are no longer needed, and send a message to the QIZ controller 44 indicating that the qubits 18-3 and 18-4 can be deallocated (FIG. 4A, step 2022). The QIZ controller 44 modifies the qubit metadata 26 to indicate that the qubits 18-3-18-4 are now available for allocation in the QIZ Z1 (FIG. 4A, step 2024).

Figure 4B:
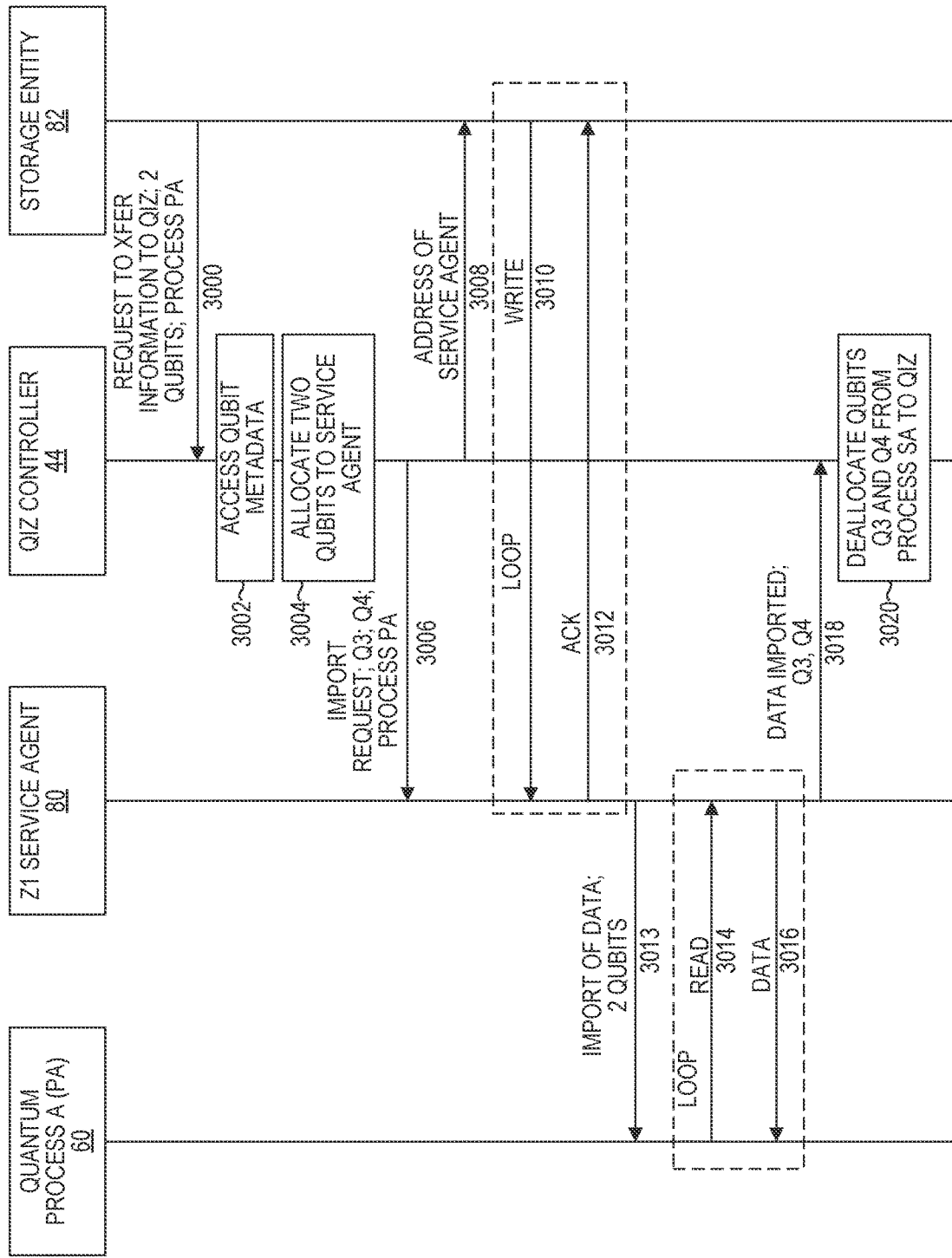

FIG. 4B is a message sequence diagram illustrating components illustrated in FIGS. 3A-3C, messages communicated between such components, and actions taken by such components to import information into the QIZ Z1 according to another implementation. In this implementation, steps 3000-3012 are identical to corresponding steps 2000-2012 discussed above with regard to FIG. 4A, and for the sake of brevity, will not be repeated herein.

In this implementation, after the data has been imported to the qubits 18-3 and 18-4, the service agent 80 sends the quantum process 60 a message indicating that an import of data has occurred, that the data is destined for the quantum process 60, and that the data is stored in two qubits (FIG. 4B, step 3013). The quantum process 60 and the service agent 80 engage in a transfer of information wherein the service agent 80 provides the data stored in the qubits 18-3 and 18-4 to the quantum process 60 (FIG. 4B, steps 3014-3016). After the information has been transferred to the quantum process 60, the service agent 80 sends a message to the QIZ controller 44 indicating that the information has been transferred to the quantum process 60 and the qubits 18-3 and 18-4 can be deallocated. The QIZ controller 44 modifies the qubit metadata 26 to indicate that the qubits 18-3-18-4 are now available for allocation in the QIZ Z1 (FIG. 4B, step 3020).

Figure 5A:
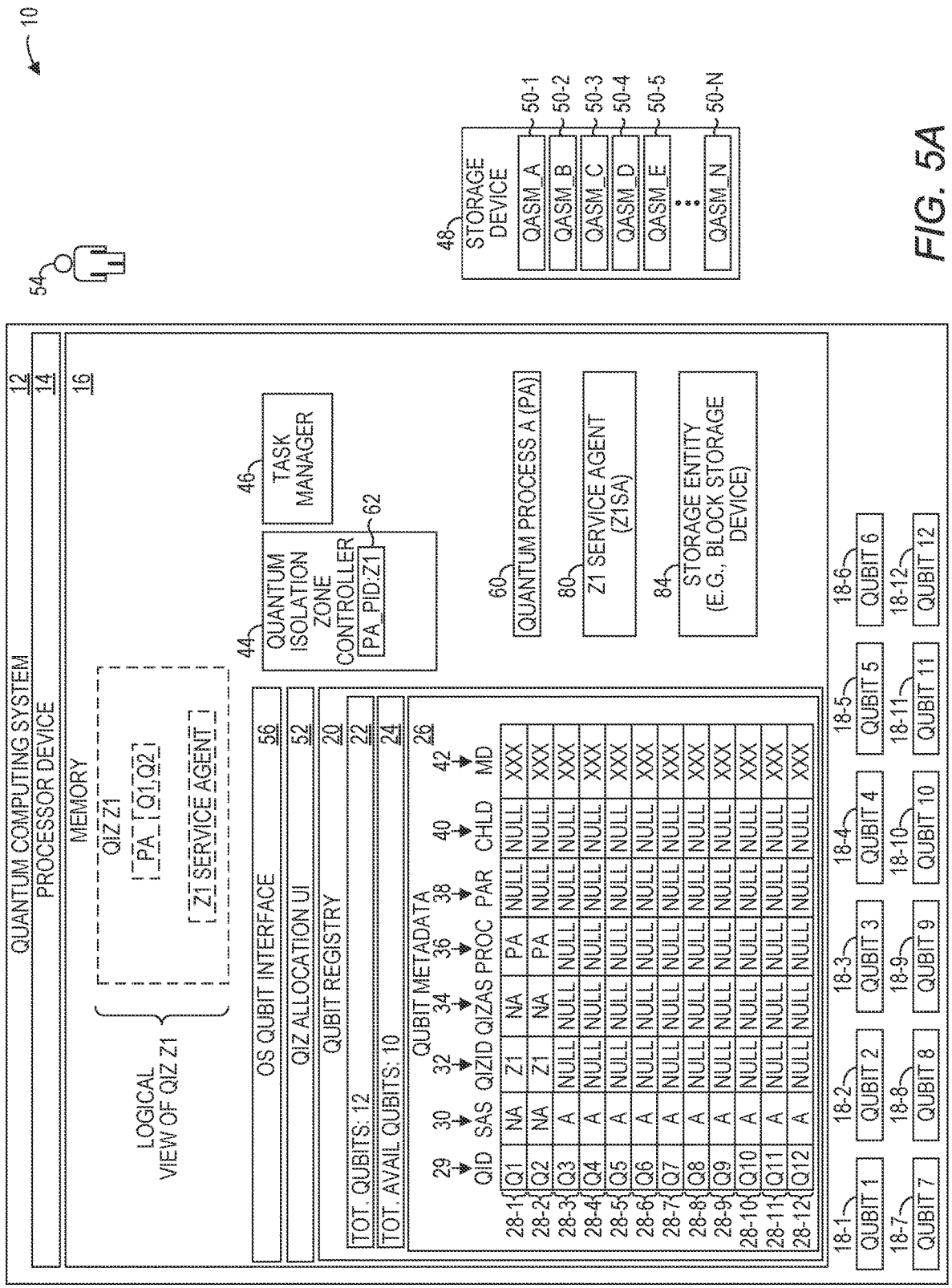
FIGS. 5A-5D are block diagrams illustrating an exportation of data from a QIZ according to one implementation.

FIGS. 5A-5D are block diagrams of the environment 10 according to another implementation. Referring first to FIG. 5A, as discussed above with regard to FIGS. 3A-3C, in this implementation, as part of the establishment of the QIZ Z1 or in response to a request to transfer information, the QIZ controller 44 or another OS component initiates the service agent 80 that is associated with the QIZ Z1 and operates to facilitate the transfer of information between the QIZ Z1 and a storage entity outside of the QIZ Z1.

In this example, the transfer of information is an exportation of information from the QIZ Z1 to a designated storage entity 84. The storage entity 84 can comprise, for example, an executing process, a storage location such as a memory or a storage device, an address, such as an IP address where information can be streamed to or from, or any other entity via which information may be obtained or may be sent. In this example, the storage entity 84 is a block storage device.

Figure 5B:
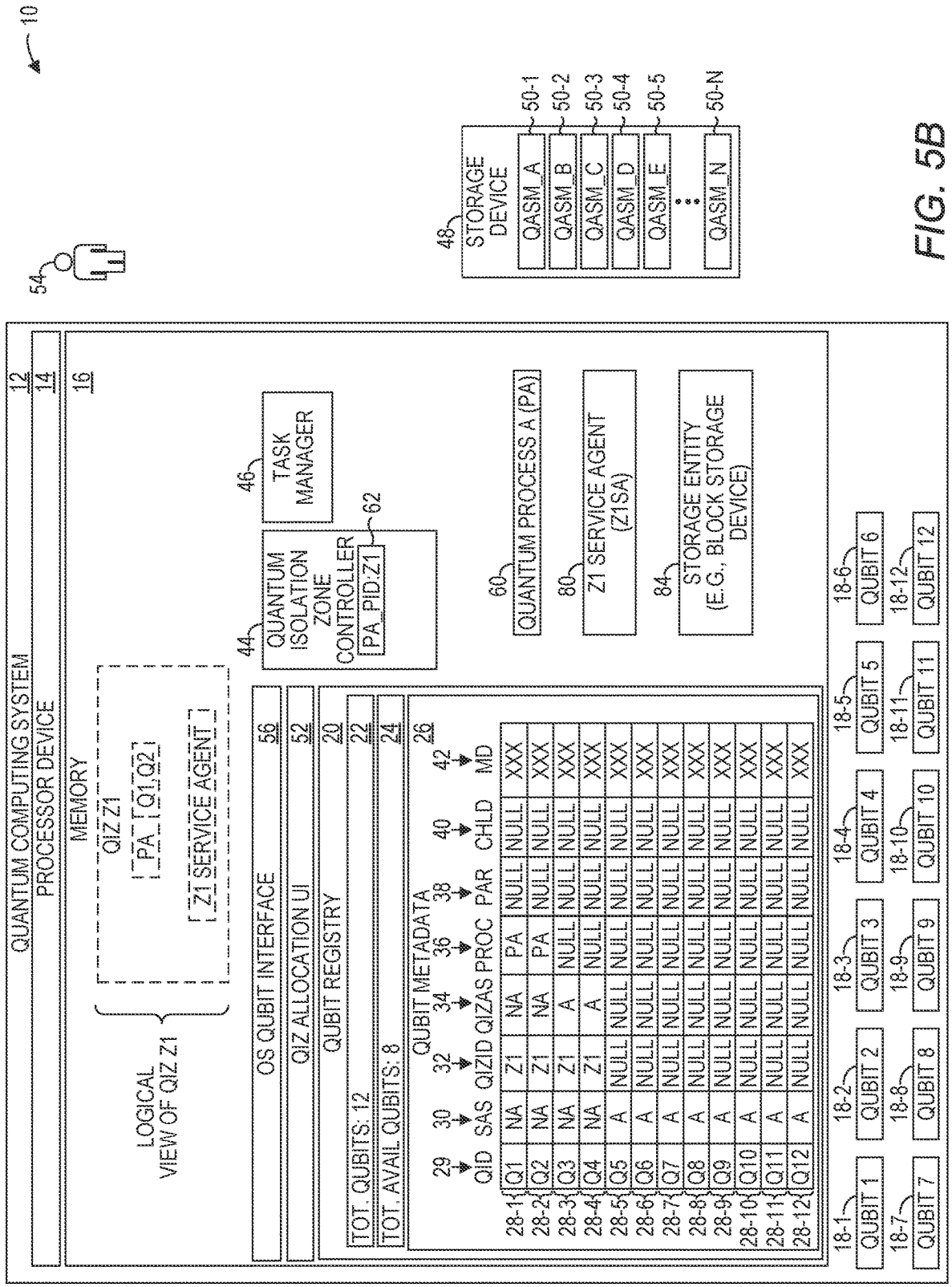

In this example, the quantum process 60 sends a request to the QIZ controller 44 to transfer information to the storage entity 84. The request may identify a number of qubits 18 needed for the transfer of information. For purposes of illustration, assume that the request indicates two qubits 18 will be needed to transfer the information. The QIZ controller 44 accesses the qubit metadata 26 and determines that the QIZ Z1 has no available qubits 18. Referring now to FIG. 5B, the QIZ controller 44 determines that the qubits 18-3 and 18-4 are available for allocation to a QIZ, and modifies the qubit metadata 26 to allocate the qubits 18-3 and 18-4 to the QIZ Z1.

Figure 5C:
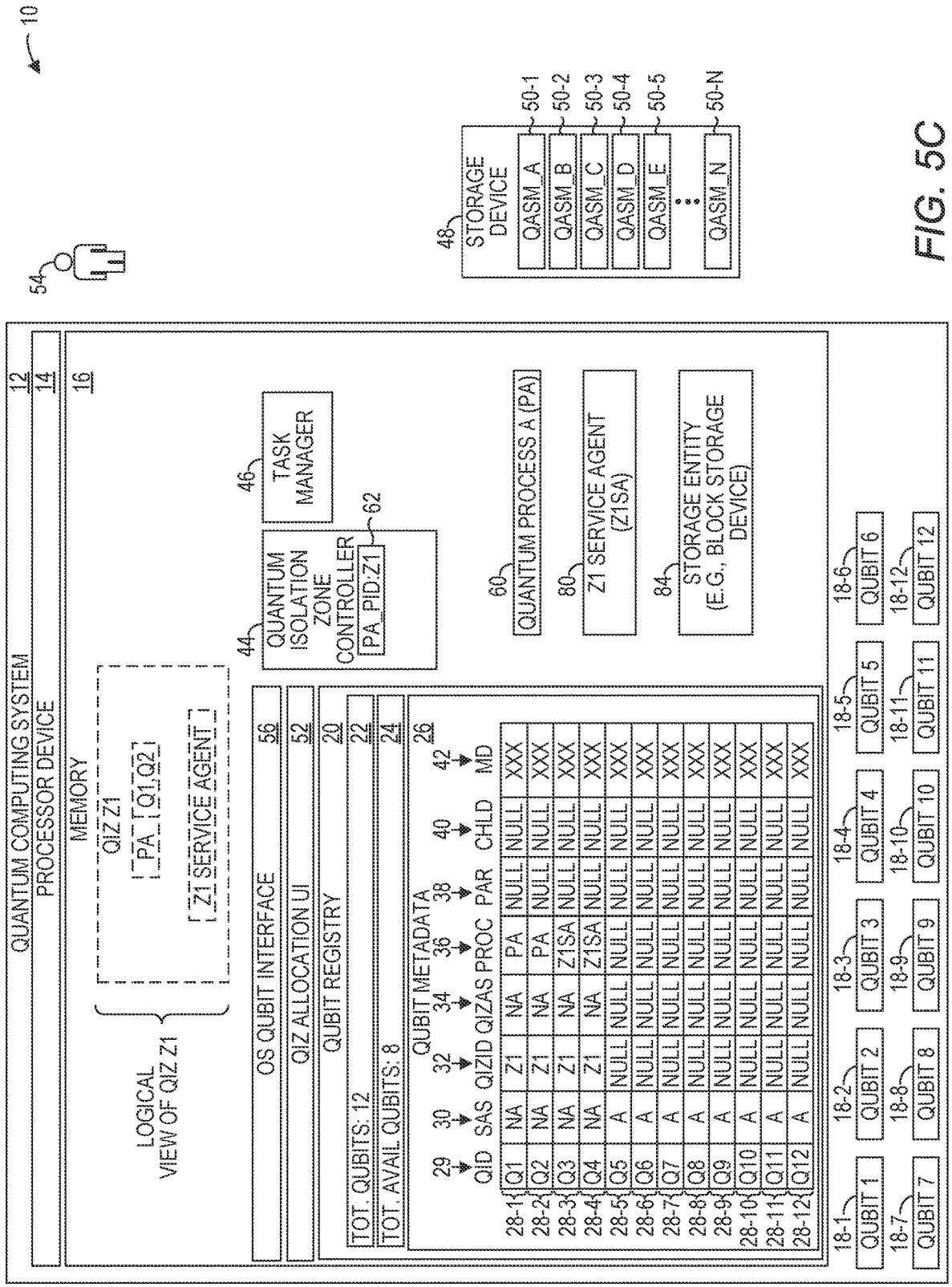

Referring now to FIG. 5C, the QIZ controller 44 modifies the qubit metadata 26 to allocate the qubits 18-3 and 18-4 to the service agent 80. The QIZ controller 44 sends a message to the service agent 80 indicating that there is to be an exportation of information from the quantum process 60, and that the qubits 18-3 and 18-4 have been allocated to the service agent 80 to facilitate the transfer of information.

The service agent 80 sends a message to the quantum process 60 indicating that the transfer of information can begin. The quantum process 60 sends data to the service agent 80. The service agent 80, in some implementations, may be a proxy such that when the quantum process 60 issues a write to a qubit, the service agent 80 is automatically and transparently invoked, and directs the write to either the qubit 18-3 or 18-4. The QIZ controller 44 determines that data has been written to a qubit 18-3 or 18-4. The QIZ controller 44 reads the qubit 18 and sends the data to the storage entity 84. The QIZ controller 44 resets, or flushes, the qubit 18. The QIZ controller 44 sends a message to the service agent 80 indicating that the qubit 18 can be written to again. The service agent 80 sends a message to the quantum process 60 indicating that the quantum process 60 can issue another write to the qubit 18. This process repeats until the quantum process 60 sends a message to the service agent 80 indicating that the quantum process 60 has finished exporting the desired information.

Figure 5D:
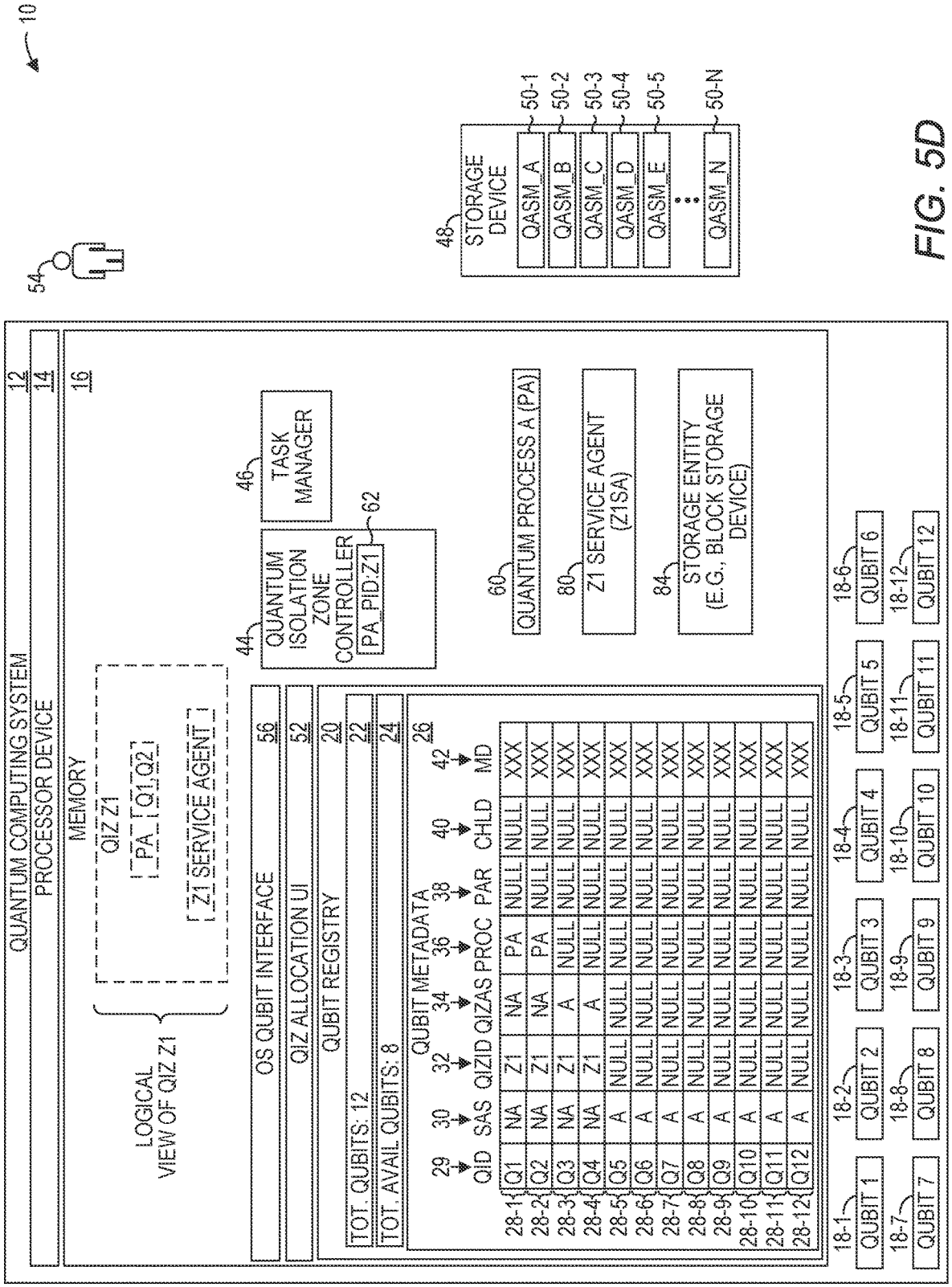

The service agent 80 sends a message to the QIZ controller 44 indicating that the transfer of information is complete. Referring now to FIG. 5D, the QIZ controller 44 modifies the qubit metadata 26 to deallocate the qubits 18-3 and 18-4 from the service agent 80, and to indicate that the qubits 18-3 and 18-4 are available for allocation within the QIZ Z1.

Figure 6:
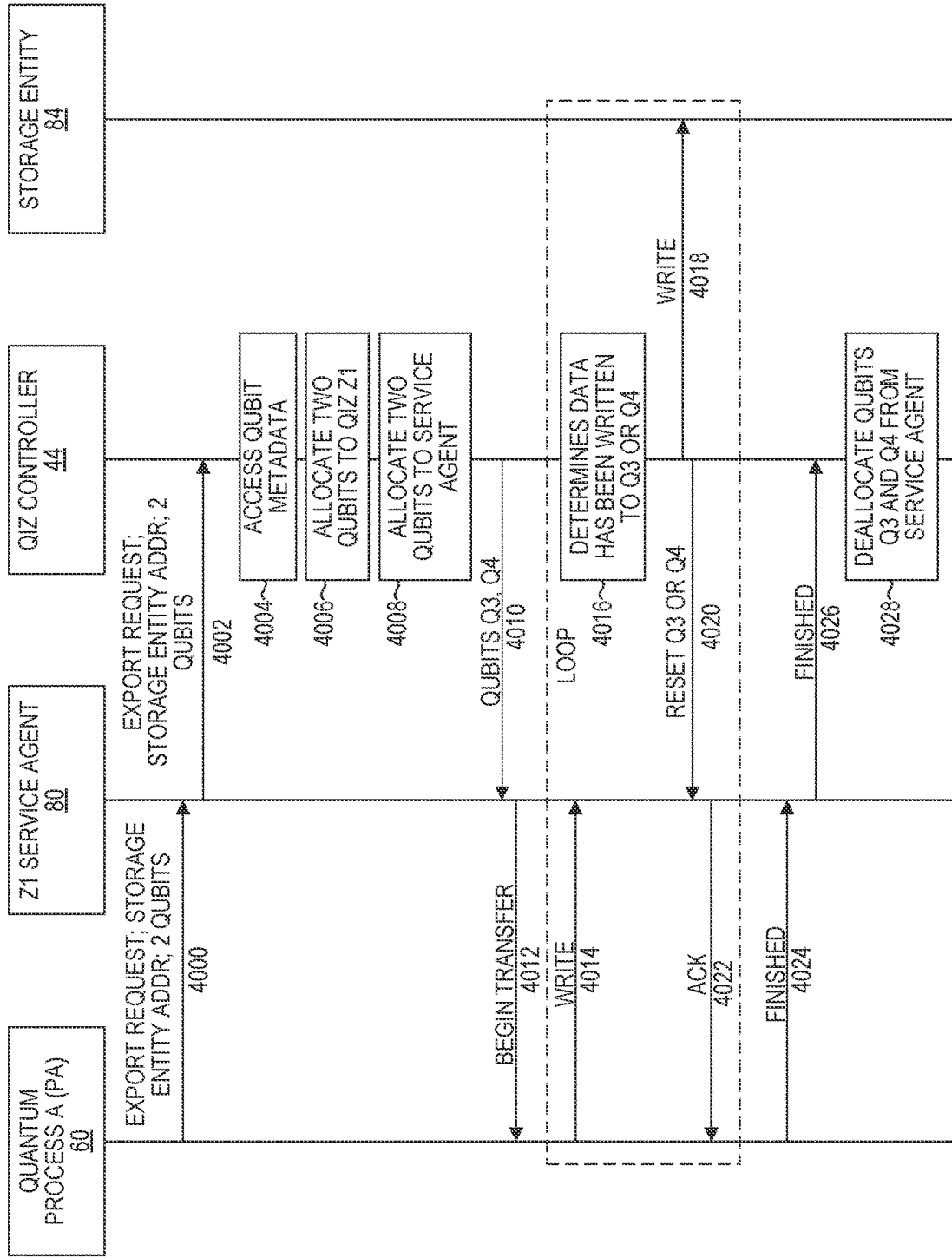
FIGS. 6 and 7 are message sequence diagrams illustrating communications between and actions taken by components illustrated in FIGS. 5A-5D according to one implementation.

FIG. 6 is a message sequence diagram illustrating components illustrated in FIGS. 5A-5D, messages communicated between such components, and actions taken by such components to import information into the QIZ Z1 according to one implementation. The quantum process 60 sends a request to the service agent 80 indicating a desire to export information. The request includes a request for two qubits and identifies the storage entity 84 as the destination for the information (FIG. 6, step 4000). In this example, the storage entity 84 may comprise, for example, a block storage device. In other implementations, the quantum process 60 may send the request directly to the QIZ controller 44. The service agent 80 sends a request to the QIZ controller 44 indicating an export of information is to occur to the storage entity 84 and requesting two qubits to facilitate the transfer of information from the first QIZ to the storage entity 84 (FIG. 6, step 4002).

The QIZ controller 44 accesses the qubit metadata 26 and determines that no qubits 18 are currently available to be allocated in the QIZ Z1 (FIG. 6, step 4004). The QIZ controller 44 determines that the qubits 18-3 and 18-4 are available to be allocated to the QIZ Z1 and modifies the qubit metadata 26 to allocate the qubits 18-3 and 18-4 to the QIZ Z1 (FIG. 6, step 4006). The QIZ controller 44 then modifies the qubit metadata 26 to allocate the qubits 18-3 and 18-4 to the service agent 80 (FIG. 6, step 4008).

The QIZ controller 44 responds to the service agent 80 with a message that contains the addresses/locations of the qubits 18-3 and 18-4 (FIG. 6, step 4010). The service agent 80 sends a message to the quantum process 60 indicating that the transfer of information can begin (FIG. 6, step 4012).

A loop begins wherein the quantum process 60 invokes the service agent 80 to store data in one of the qubits 18-3 or 18-4 (FIG. 6, step 4014). The quantum process 60 may identify a particular qubit or may allow the service agent 80 to select the particular qubit 18-3 or 18-4 to which the data will be stored. In some implementations, the service agent 80 is arranged as a proxy service that is invoked upon certain actions of the quantum process 60, such as upon a read or a write of a qubit 18.

The QIZ controller 44 determines that data has been written to the qubit 18-3 or 18-4 (FIG. 6, step 4016). The QIZ controller 44 may make this determination in any of a number of different ways. In one implementation, the QIZ controller 44 may monitor the qubits 18-3 and 18-4 via mechanisms disclosed in U.S. Patent Application Publication No. 2021/0374584 A1, entitled "Qubit Value Change Monitor," the contents of which are hereby incorporated by reference herein in their entirety. In other implementations, the service agent 80 sends a message to the QIZ controller 44 indicating that information has been stored to the particular qubit 18. The QIZ controller 44 reads the particular qubit 18 and communicates the information to the storage entity 84 (FIG. 6, step 4018). The QIZ controller 44 informs the service agent 80 that the particular qubit 18 has been successfully read (FIG. 6, step 4020). In some implementations, the QIZ controller 44 may reset or "flush" the particular qubit 18. The service agent 80 sends a message to the quantum process 60 indicating that the quantum process 60 can initiate another write (FIG. 6, step 4022). This process repeats until the quantum process 60 has finished exporting the information.

When finished, the quantum process 60 sends a message to the service agent 80 indicating that the quantum process 60 has finished transferring information (FIG. 6, step 4024). The service agent 80 sends a message to the QIZ controller 44 indicating that the quantum process 60 has finished exporting the information (FIG. 6, step 4026). The QIZ controller 44 may then modify the qubit metadata 26 to deallocate the qubits 18-3 and 18-4 from the service agent 80 but keep the qubits 18-3 and 18-4 allocated to the QIZ Z1, or may return the qubits 18-3 and 18-4 to the quantum computing system 12 for subsequent allocation to a different QIZ (FIG. 6, step 4028).

Figure 7:
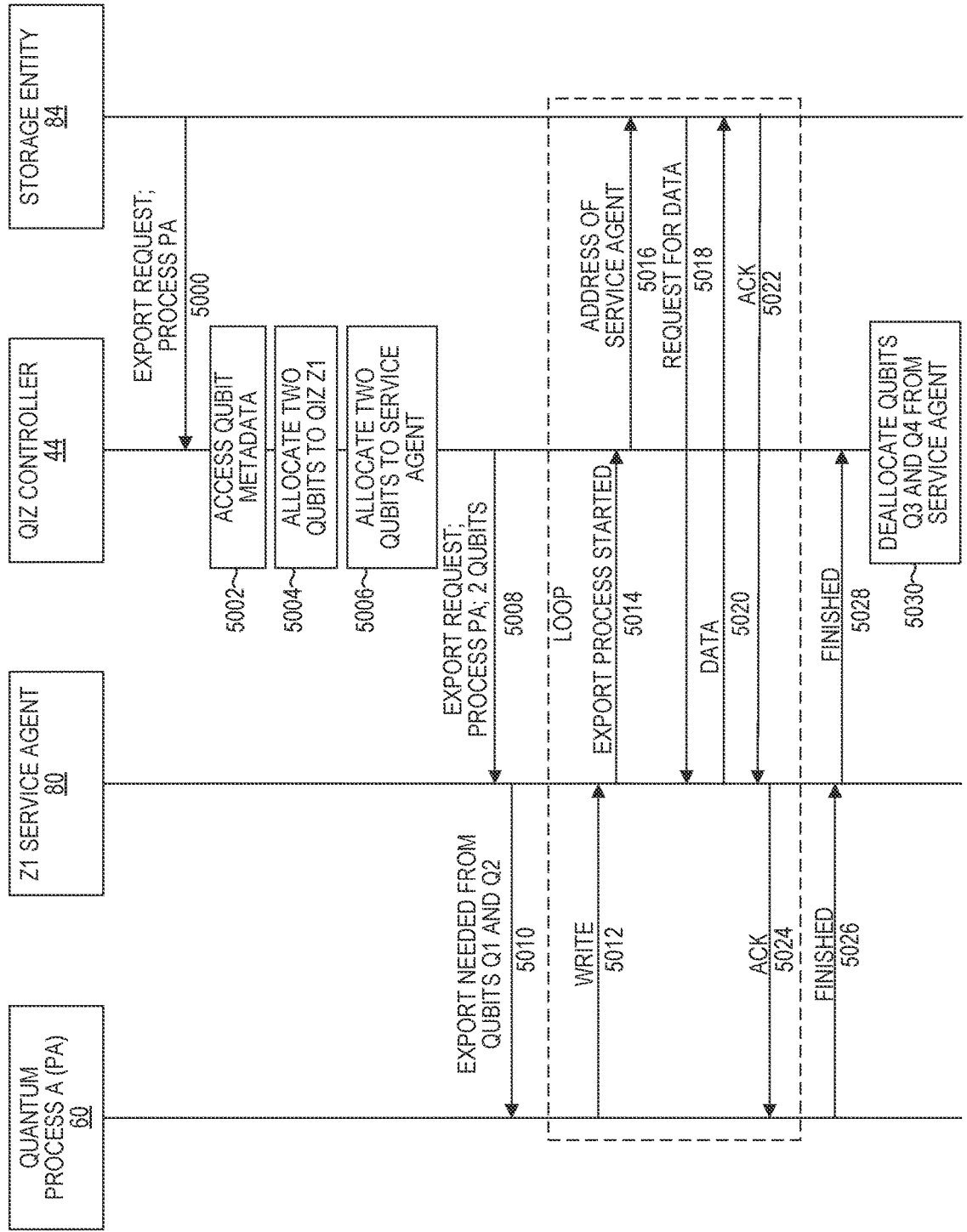

FIG. 7 is a message sequence diagram illustrating components illustrated in FIGS. 5A-5D, messages communicated between such components, and actions taken by such components to import information into the QIZ Z1 according to another implementation. In this example, the transfer of information is an exportation of information from the QIZ Z1 to the designated storage entity 84. In this example, the storage entity 84 is a process that desires an exportation of data from the quantum process 60. The storage entity 84 sends an export request to the QIZ controller 44 indicating a desire to obtain data from the quantum process 60 (FIG. 7, step 5000).

The QIZ controller 44 accesses the qubit metadata 26 and determines that no qubits 18 are currently available to be allocated in the QIZ Z1 (FIG. 7, step 5002). The QIZ controller 44 determines that the qubits 18-3 and 18-4 are available to be allocated to the QIZ Z1 and modifies the qubit metadata 26 to allocate the qubits 18-3 and 18-4 to the QIZ Z1 (FIG. 7, step 5004). The QIZ controller 44 then modifies the qubit metadata 26 to allocate the qubits 18-3 and 18-4 to the service agent 80 (FIG. 7, step 5006).

The QIZ controller 44 sends a message to the service agent 80 that indicates an export request from the quantum process 60 is desired. The message also contains the addresses/locations of the qubits 18-3 and 18-4 (FIG. 7, step 5008). The service agent 80 sends a message to the quantum process 60 indicating that a transfer of information from the quantum process 60 is desired (FIG. 7, step 5010).

A loop begins wherein the quantum process 60 invokes the service agent 80 to store data in one of the qubits 18-3 or 18-4 (FIG. 7, step 5012). The quantum process 60 may identify a particular qubit or may allow the service agent 80 to select the particular qubit 18-3 or 18-4 to which the data will be stored. In some implementations, the service agent 80 is arranged as a proxy service that is invoked upon certain actions of the quantum process 60, such as upon a read or a write of a qubit 18.

The service agent 80 sends a message to the QIZ controller 44 indicating that the export process has begun (FIG. 7, step 5014). The QIZ controller 44 sends a message to the storage entity 84 identifying the address/location of the service agent 80 (FIG. 7, step 5016). The storage entity 84 requests data from the service agent 80 (FIG. 7, step 5018). The service agent 80 sends the data written to the qubit 18-3 or 18-4 by the quantum process 60 to the storage entity 84 (FIG. 7, step 5020). The storage entity 84 sends an acknowledgement to the service agent 80 (FIG. 7, step 5022). The service agent 80 sends a message to the quantum process 60 indicating that the quantum process 60 can initiate another write (FIG. 7, step 5024). This process repeats until the quantum process 60 has finished exporting the information.

When finished, the quantum process 60 sends a message to the service agent 80 indicating that the quantum process 60 has finished transferring information (FIG. 7, step 5026). The service agent 80 sends a message to the QIZ controller 44 indicating that the quantum process 60 has finished exporting the information (FIG. 7, step 5028). The QIZ controller 44 may then modify the qubit metadata 26 to deallocate the qubits 18-3 and 18-4 from the service agent 80 but keep the qubits 18-3 and 18-4 allocated to the QIZ Z1, or may return the qubits 18-3 and 18-4 to the quantum computing system 12 for subsequent allocation to a different QIZ (FIG. 7, step 5030).

Figure 8:
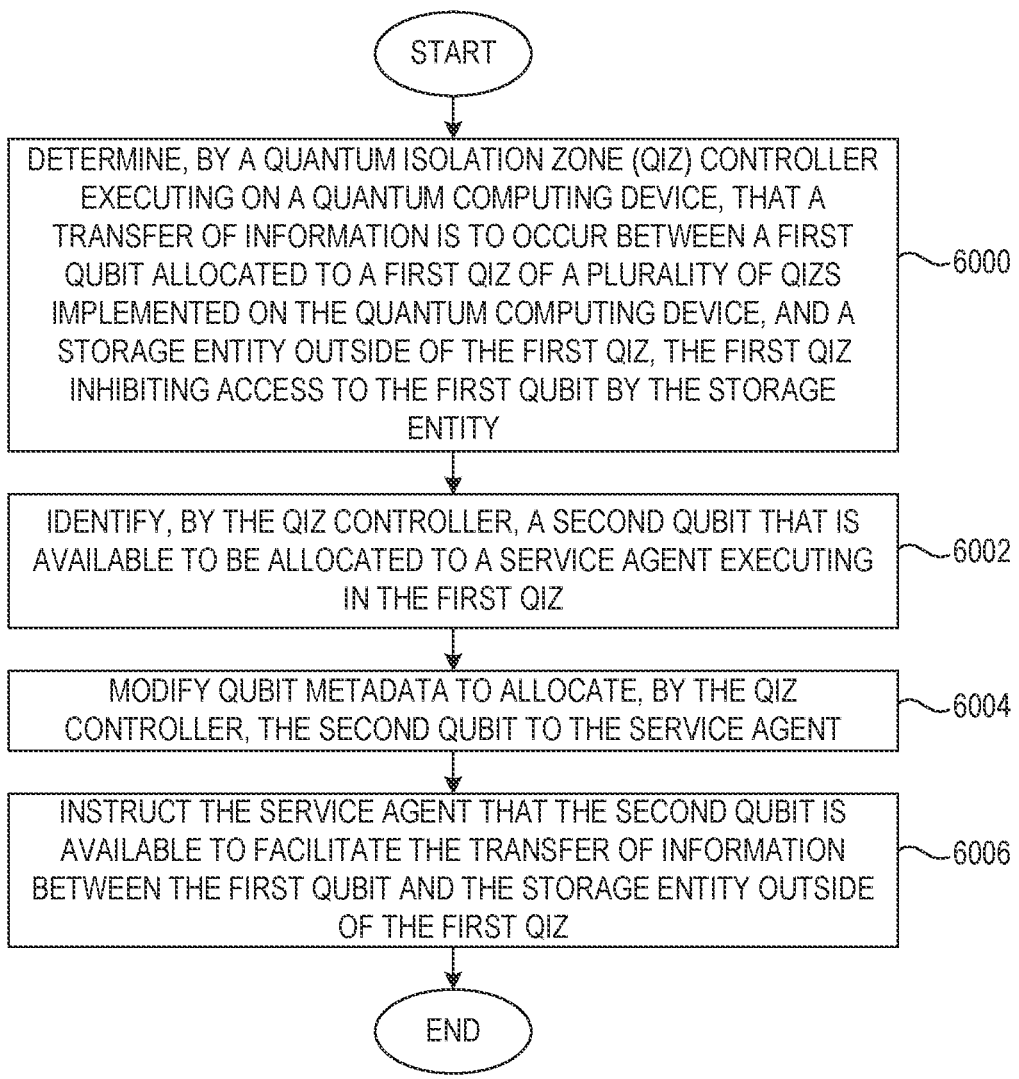
FIG. 8 is a flowchart of a method for data exchange according to one implementation.

FIG. 8 is a flowchart of a method for data exchange between a qubit in a quantum isolation zone and a storage entity outside of the quantum isolation zone according to one implementation. FIG. 8 will be discussed in conjunction with FIGS. 3A-3C. The QIZ controller 44 determines that a transfer of information is to occur between a first qubit 18 allocated to the QIZ Z1 of the plurality of QIZs implemented on the quantum computing device, and the storage entity 82 outside of the QIZ Z1, the QIZ Z1 inhibiting access to the first qubit 18 by the storage entity 82 (FIG. 8, block 6000). The QIZ controller 44 identifies a second qubit 18 that is available to be allocated to the service agent 80 executing in the QIZ Z1 (FIG. 8, block 6002). The QIZ controller 44 modifies the qubit metadata 26 to allocate the second qubit 18 to the service agent 80 (FIG. 8, block 6004). The QIZ controller 44 instructs the service agent 80 that the second qubit 18 is available to facilitate the transfer of information between the first qubit 18 and the storage entity 82 outside of the QIZ Z1 (FIG. 8, block 6006).

Figure 9:
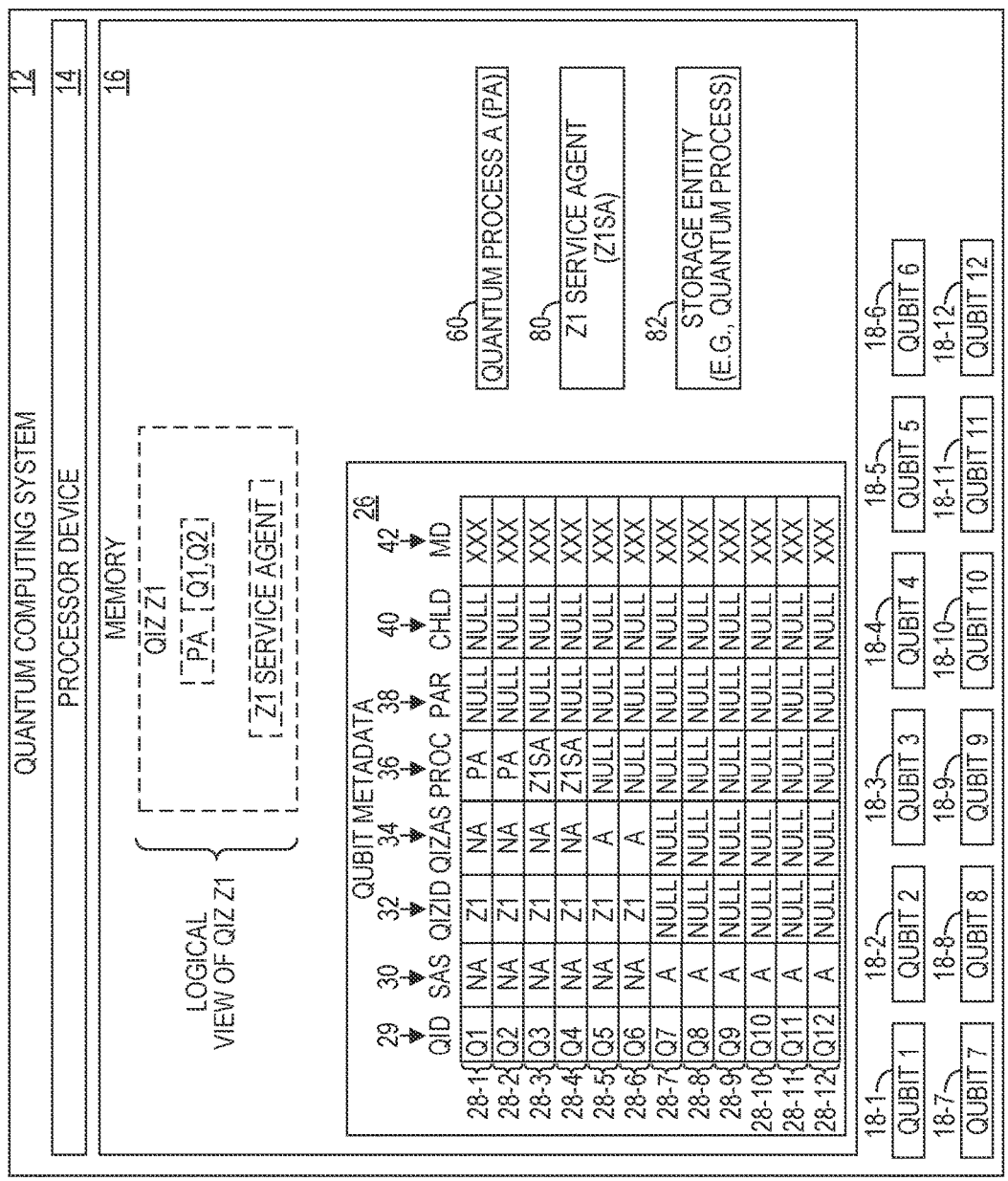
FIG. 9 is a simplified block diagram of the environment illustrated in FIGS. 3A-3C according to one implementation.

FIG. 9 is a simplified block diagram of the environment 10 illustrated in FIGS. 3A-3C according to one implementation. The quantum computing system 12 includes the memory 16 and the processor device 14 coupled to the memory 16. The processor device 14 is to determine that a transfer of information is to occur between a first qubit 18 allocated to the QIZ Z1 of a plurality of QIZs implemented on the quantum computing system 12, and the storage entity 82 outside of the QIZ Z1, the QIZ Z1 inhibiting access to the first qubit 18 by the storage entity 82. The processor device 14 is further to identify a second qubit 18 that is available to be allocated to the service agent 80 executing in the QIZ Z1. The processor device 14 is further to modify the qubit metadata 26 to allocate the second qubit 18 to the service agent 80. The processor device 14 is further to instruct the service agent 80 that the second qubit 18 is available to facilitate the transfer of information between the first qubit 18 and the storage entity 84 outside of the QIZ Z1.

Figure 10:
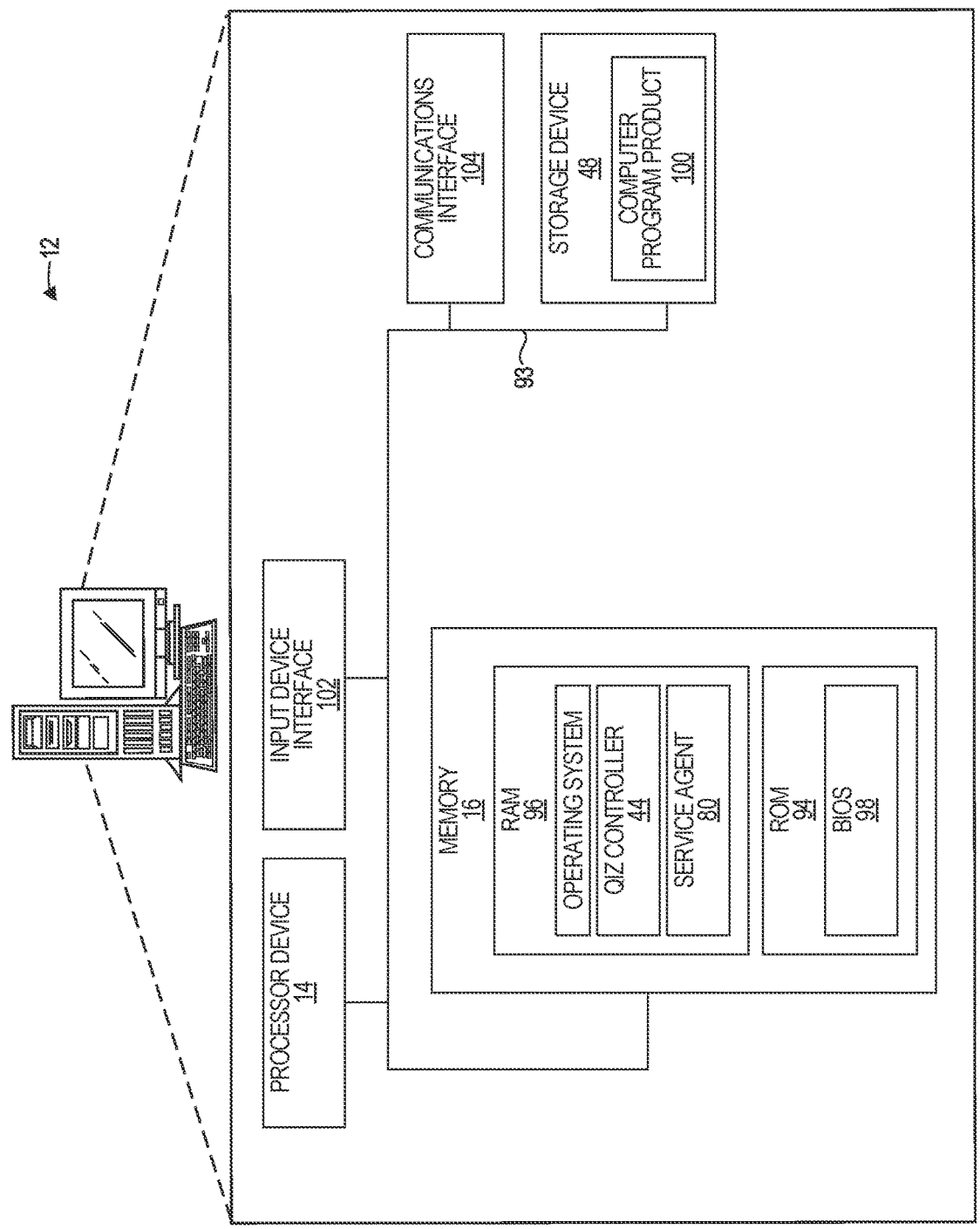
FIG. 10 is a block diagram of a quantum computing system suitable for implementing the examples disclosed herein.

FIG. 10 is a block diagram of the quantum computing system 12 suitable for implementing examples according to one example. The quantum computing system 12 may comprise any computing or electronic device capable of including firmware, hardware, and/or executing software instructions to implement the functionality described herein. The quantum computing system 12 includes the processor device 14, the system memory 16, and a system bus 93. The system bus 93 provides an interface for system components including, but not limited to, the system memory 16 and the processor device 14. The processor device 14 can be any commercially available or proprietary processor device.

The system bus 93 may be any of several types of bus structures that may further interconnect to a memory bus (with or without a memory controller), a peripheral bus, and/or a local bus using any of a variety of commercially available bus architectures. The system memory 16 may include non-volatile memory 94 (e.g., read-only memory (ROM), erasable programmable read-only memory (EPROM), electrically erasable programmable read-only memory (EEPROM), etc.), and volatile memory 96 (e.g., random-access memory (RAM)). A basic input/output system (BIOS) 98 may be stored in the non-volatile memory 94 and can include the basic routines that help to transfer information between elements within the quantum computing system 12. The volatile memory 96 may also include a high-speed RAM, such as static RAM, for caching data.

The quantum computing system 12 may further include or be coupled to a non-transitory computer-readable storage medium such as the storage device 48, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 48 and other drives associated with computer-readable media and computer-usable media may provide non-volatile storage of data, data structures, computer-executable instructions, and the like.

A number of modules can be stored in the storage device 48 and in the volatile memory 96, including an operating system and one or more program modules, such as the QIZ controller 44 and/or the service agent 80, which may implement the functionality described herein in whole or in part. All or a portion of the examples may be implemented as a computer program product 100 stored on a transitory or non-transitory computer-usable or computer-readable storage medium, such as the storage device 48, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the QIZ controller 44 and/or the service agent 80 in the volatile memory 96, may serve as a controller, or control system, for the quantum computing system 12 that is to implement the functionality described herein.

The operator 54 may also be able to enter one or more configuration commands through a keyboard (not illustrated), a pointing device such as a mouse (not illustrated), or a touch-sensitive surface such as a display device. Such input devices may be connected to the processor device 14 through an input device interface 102 that is coupled to the system bus 93 but can be connected by other interfaces such as a parallel port, an Institute of Electrical and Electronic Engineers (IEEE) 1394 serial port, a Universal Serial Bus (USB) port, an IR interface, and the like. The quantum computing system 12 may also include a communications interface 104 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
    determining, by a quantum isolation zone (QIZ) controller executing on a quantum computing device, that a transfer of information is to occur between a first qubit allocated to a first QIZ of a plurality of QIZs implemented on the quantum computing device, and a storage entity outside of the first QIZ, the first QIZ inhibiting access to the first qubit by the storage entity;
    identifying, by the QIZ controller, a second qubit that is available to be allocated to a service agent executing in the first QIZ;
    modifying qubit metadata to allocate, by the QIZ controller, the second qubit to the service agent; and
    instructing the service agent that the second qubit is available to facilitate the transfer of information between the first qubit and the storage entity outside of the first QIZ.

2. The method of claim 1 wherein determining that the transfer of information is to occur comprises receiving, from the service agent, a request for at least one qubit to facilitate the transfer of information from the first qubit to the storage entity outside of the first QIZ.

3. The method of claim 2 wherein identifying the second qubit that is available comprises determining, by the QIZ controller, that the second qubit is allocated to the first QIZ and is available for allocation.

4. The method of claim 2 wherein identifying the second qubit that is available comprises:
    determining, by the QIZ controller, that no qubit allocated to the first QIZ is available for allocation;
    determining, by the QIZ controller, that the second qubit is unallocated to any QIZ and is available; and
    modifying the qubit metadata to allocate the second qubit to the first QIZ.

5. The method of claim 1 further comprising:
    monitoring, by the QIZ controller, the second qubit;
    determining, by the QIZ controller, that data has been stored in the second qubit;
    reading, by the QIZ controller, the second qubit to obtain qubit data; and
    communicating, by the QIZ controller, the qubit data to the storage entity.

6. The method of claim 1 wherein determining that the transfer of information is to occur comprises receiving, from the storage entity, a request for data associated with a quantum process; and
    in response to the request, accessing the qubit metadata to determine that the first qubit is allocated to the quantum process.

7. The method of claim 6 further comprising:
    sending, by the service agent, information to the quantum process informing the quantum process that an export of data from the first qubit is to occur;
    receiving, by the service agent, data from the quantum process, the data derived from the first qubit; and
    sending, by the service agent, the data to the storage entity.

8. The method of claim 7 further comprising:
    providing, by the QIZ controller to the service agent, address information of the storage entity.

9. The method of claim 1 wherein determining that the transfer of information is to occur comprises receiving, from the storage entity, a request to transfer the information from the storage entity to the first QIZ.

10. The method of claim 9 further comprising providing, by the QIZ controller, an address of the service agent to the storage entity.

11. The method of claim 9 wherein the request to transfer the information identifies a quantum process as a destination for the information, further comprising:
    determining, by the QIZ controller, that the information has been transferred from the storage entity to the first QIZ; and
    modifying the qubit metadata to cause the second qubit to be allocated to the quantum process.

12. The method of claim 9 wherein the request to transfer the information identifies a quantum process as a destination for the information, further comprising:
- sending, by the service agent to the quantum process, a message indicating that the information has been transferred into the first QIZ; and
- receiving, by the service agent from the quantum process, a request for the information.

13. A quantum computing system comprising:
a memory; and
a processor device coupled to the memory to:
- determine that a transfer of information is to occur between a first qubit allocated to a first quantum isolation zone (QIZ) of a plurality of QIZs implemented on a quantum computing device, and a storage entity outside of the first QIZ, the first QIZ inhibiting access to the first qubit by the storage entity;
- identify a second qubit that is available to be allocated to a service agent executing in the first QIZ;
- modify qubit metadata to allocate the second qubit to the service agent; and
- instruct the service agent that the second qubit is available to facilitate the transfer of information between the first qubit and the storage entity outside of the first QIZ.

14. The quantum computing system of claim 13 wherein to determine that the transfer of information is to occur, the processor device is further to receive, from the service agent, a request for at least one qubit to facilitate the transfer of information from the first qubit to the storage entity outside of the first QIZ.

15. The quantum computing system of claim 13 wherein to determine that the transfer of information is to occur, the processor device is further to receive, from the storage entity, a request for data associated with a quantum process; and
- in response to the request, access the qubit metadata to determine that the first qubit is allocated to the quantum process.

16. The quantum computing system of claim 13 wherein to determine that the transfer of information is to occur, the processor device is further to receive, from the storage entity, a request to transfer the information from the storage entity to the first QIZ.

17. A non-transitory computer-readable storage medium that includes executable instructions configured to cause a processor device on a quantum computing system to:
- determine that a transfer of information is to occur between a first qubit allocated to a first quantum isolation zone (QIZ) of a plurality of QIZs implemented on a quantum computing device, and a storage entity outside of the first QIZ, the first QIZ inhibiting access to the first qubit by the storage entity;
- identify a second qubit that is available to be allocated to a service agent executing in the first QIZ;
- modify qubit metadata to allocate the second qubit to the service agent; and
- instruct the service agent that the second qubit is available to facilitate the transfer of information between the first qubit and the storage entity outside of the first QIZ.

18. The non-transitory computer-readable storage medium of claim 17 wherein to determine that the transfer of information is to occur, the instructions further cause the processor device to receive, from the service agent, a request for at least one qubit to facilitate the transfer of information from the first qubit to the storage entity outside of the first QIZ.

19. The non-transitory computer-readable storage medium of claim 17 wherein to determine that the transfer of information is to occur, the instructions further cause the processor device to receive, from the storage entity, a request for data associated with a quantum process; and
- in response to the request, access the qubit metadata to determine that the first qubit is allocated to the quantum process.

20. The non-transitory computer-readable storage medium of claim 17 wherein to determine that the transfer of information is to occur, the instructions further cause the processor device to receive, from the storage entity, a request to transfer the information from the storage entity to the first QIZ.

* * * * *